United States Patent
Kalaboukis

(10) Patent No.: US 11,676,116 B1
(45) Date of Patent: *Jun. 13, 2023

(54) TANDEM PURCHASING AND INCENTIVIZED SHOPPING

(71) Applicant: WELLS FARGO BANK, N.A., San Francisco, CA (US)

(72) Inventor: Chris Kalaboukis, San Jose, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/714,832

(22) Filed: Apr. 6, 2022

Related U.S. Application Data

(63) Continuation of application No. 16/746,396, filed on Jan. 17, 2020, now Pat. No. 11,334,857, which is a continuation of application No. 15/139,794, filed on Apr. 27, 2016, now Pat. No. 10,621,564.

(51) Int. Cl.
*G06Q 20/10* (2012.01)
*H04L 67/02* (2022.01)
*H04L 67/52* (2022.01)
*G06Q 50/00* (2012.01)

(52) U.S. Cl.
CPC ............ *G06Q 20/10* (2013.01); *H04L 67/02* (2013.01); *H04L 67/52* (2022.05); *G06Q 50/01* (2013.01)

(58) Field of Classification Search
CPC ........ G06Q 20/10; G06Q 50/01; H04L 67/02; H04L 67/18
USPC ................................................. 235/375, 380
See application file for complete search history.

(56) References Cited

U.S. PATENT DOCUMENTS

| | | | |
|---|---|---|---|
| 8,826,022 B1 | 9/2014 | Iyer | |
| 9,978,052 B2 * | 5/2018 | Zhao | G06Q 20/384 |
| 10,242,351 B1 | 3/2019 | Wilson et al. | |
| 10,621,564 B1 | 4/2020 | Kalaboukis | |
| 2005/0043996 A1 | 2/2005 | Silver | |
| 2006/0131392 A1 | 6/2006 | Cooper | |
| 2012/0173396 A1 | 7/2012 | Melby et al. | |
| 2012/0197794 A1 | 8/2012 | Grigg et al. | |
| 2013/0159173 A1 | 6/2013 | Sivaraman et al. | |
| 2013/0282490 A1 * | 10/2013 | Kramer | G06Q 30/0261 705/14.58 |
| 2014/0136349 A1 | 5/2014 | Dave et al. | |

(Continued)

*Primary Examiner* — Paultep Savusdiphol
(74) *Attorney, Agent, or Firm* — Kilpatrick Townsend & Stockton LLP

(57) ABSTRACT

Tandem transactions facilitated through automatic application of a tandem transaction limit are provided. A system includes a group manager that identifies a group including respective identifications indicative of a first user and a second user. A transaction limit manager establishes a first transaction limit for the first user, a second transaction limit for the second user, and a third transaction limit for a combination of the first and second user. A transaction manager dynamically applies the third transaction limit based on a determination that the first and second user are performing a joint transaction. The transaction manager revokes the third transaction limit after a threshold time and applies the first transaction limit to first user transactions and the second transaction limit to second user transactions. Incentives are provided if a user remains at a location for a threshold amount of time or causes other users to visit the location.

20 Claims, 14 Drawing Sheets

(56) References Cited

U.S. PATENT DOCUMENTS

| | | | |
|---|---|---|---|
| 2014/0164079 A1* | 6/2014 | Tapley | G06Q 30/0207 |
| | | | 705/14.16 |
| 2014/0172704 A1 | 6/2014 | Atagun et al. | |
| 2014/0351118 A1* | 11/2014 | Zhao | G06Q 20/326 |
| | | | 705/40 |
| 2014/0351130 A1 | 11/2014 | Cheek et al. | |
| 2015/0073959 A1 | 3/2015 | Connors et al. | |
| 2015/0134481 A1 | 5/2015 | Glickfield et al. | |
| 2015/0142661 A1* | 5/2015 | Jain | G06Q 20/389 |
| | | | 705/35 |
| 2015/0154621 A1* | 6/2015 | Taylor | H04W 4/02 |
| | | | 705/14.1 |
| 2015/0269600 A1* | 9/2015 | Randle | G06Q 30/0211 |
| | | | 705/14.14 |
| 2016/0042378 A1* | 2/2016 | Gupta | H04W 4/024 |
| | | | 705/14.1 |
| 2016/0267487 A1 | 9/2016 | Atagun et al. | |
| 2017/0352058 A1* | 12/2017 | Bender | G06Q 50/01 |
| 2018/0285913 A1* | 10/2018 | Licht | G06Q 30/0255 |
| 2018/0374142 A1 | 12/2018 | Michaeli | |
| 2019/0172096 A1* | 6/2019 | Tenant de la Tour | H04W 4/14 |
| 2019/0205913 A1* | 7/2019 | Kramer | G06Q 50/01 |
| 2020/0043031 A1* | 2/2020 | Eatedali | G06Q 30/0209 |
| 2020/0111116 A1* | 4/2020 | Keller | G06Q 50/01 |

\* cited by examiner

TANDEM PURCHASING AND INCENTIVIZED SHOPPING

CROSS-REFERENCE TO RELATED APPLICATIONS

This application is a continuation of and claims priority to U.S. patent application Ser. No. 16/746,396 entitled "TANDEM PURCHASING AND INCENTIVIZED SHOPPING" filed on Jan. 17, 2020, which is a continuation of and claims priority to U.S. patent application Ser. No. 15/139,794 entitled "TANDEM PURCHASING AND INCENTIVIZED SHOPPING" filed on Apr. 27, 2016, now issued as U.S. Pat. No. 10,621,564. The entirety of the above-noted applications is incorporated by reference herein.

BACKGROUND

People, both individually and in groups, desire to develop a comprehensive evaluation of assets and liabilities to predict future income, asset values, debt-to-income ratios, as well as other information related to financial assets. Due to this, budgets are established in order to control spending, such as through the use of a credit card that has a preapproved credit limit. Existing budget planning techniques, however, fail to adequately revise transaction limits dynamically based on various considerations, including user preferences.

In addition, e-commerce has become a popular form of commerce and, therefore, brick-and-mortar retailers and shopping malls need to develop ways to incentivize consumers to physically visit their establishment. Once in the retail location, the longer the consumer remains in the location, the probability that the customer will make a purchase increases proportionally.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The various aspects provided herein are related to tandem purchasing. An aspect relates to a system that include a processor and a memory that stores executable instructions that, when executed by the processor, facilitate performance of operations. The operations may include determining a group that includes a first identification indicative of a first user and a second identification indicative of a second user. The operations may also include establishing a first transaction limit for the first user, a second transaction limit for the second user, and a third transaction limit for a combination of the first user and the second user. Further, the operations may include applying the third transaction limit based on a determination that the first user and the second user are performing a joint transaction. After a threshold time has been satisfied, the third transaction limit is revoked and the first transaction limit is applied to transactions of the first user and the second transaction limit is applied to other transactions of the second user.

Another aspect relates to a method that may include determining, by a system comprising a processor, a group comprising a first set of data indicative of a first user and a second set of data indicative of a second user. The group is authorized to conduct joint transactions with at least one entity. The method may also include determining, by the system, a first individual transaction limit for the first user, a second individual transaction limit for the second user, and a joint transaction limit for the joint transactions. The first individual transaction limit and the second individual transaction limit are default transaction limits for the first user and the second user. The method may also include determining, by the system, the first user and the second user are in a condition to perform a joint transaction and applying, by the system, the joint transaction limit to an account associated with the first user and the second user. According to an implementation, the method may include determining completion of the joint transaction and reducing an amount of the joint transaction limit by an amount of the joint transaction. According to an alternative or additional implementation, the method may include determining the first user and the second user are no longer in the condition to perform the joint transaction or a transaction time interval has expired. In either case, the first individual transaction limit is applied to transactions of the first user and the second individual transaction limit is applied to transactions of the second user.

Another aspect relates to a computer-readable storage device that stores executable instructions that, in response to execution, cause a system comprising a processor to perform operations. The operations may include determining a group that includes a first identification indicative of a first user and a second identification indicative of a second user and establishing a first transaction limit for the first user, a second transaction limit for the second user, and a third transaction limit for a combination of the first user and the second user. The operations may also include applying the third transaction limit based on a determination that the first user and the second user are performing a joint transaction. After a threshold time has been satisfied, the third transaction limit is revoked and the first transaction limit is applied to transactions of the first user and the second transaction limit is applied to other transactions of the second user.

A further aspect relates to a method that may include receiving, by a system comprising a processor, an indication that a device associated with a user has entered a defined geographic area. The method may also include outputting, by the system, a first incentive to the user through the device. The first incentive may include details related to an action that results in a second incentive. Further, the action may relate to one of a temporal aspect or a social aspect. The method may also include providing, by the system, the second incentive based on a determination that the action has been satisfied.

To the accomplishment of the foregoing and related ends, certain illustrative aspects of the innovation are described herein in connection with the following description and the annexed drawings. These aspects are indicative, however, of but a few of the various ways in which the principles of the innovation may be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Various non-limiting embodiments are further described with reference to the accompanying drawings in which.

DETAILED DESCRIPTION

The innovation is now described with reference to the drawings. In the following description, for purposes of explanation, numerous specific details are set forth in order to provide a thorough understanding of the subject innovation. It may be evident, however, that the innovation may be practiced without these specific details. In other instances, well-known structures and devices are shown in block diagram form in order to facilitate describing the innovation.

Couples and groups who wish to only make joint purchases need to manually police each other in order to ensure that those purchases only take place when all members of the couple or group are present. There is currently no way to enforce that all members of a group need to be in proximity to a specific location in order for a purchase to go through. Additionally, limits may be applied to purchases and withdrawals; however, there are no conditional limits based on the co-location or agreement of other individuals within the group. Various aspects described herein relate to revising transaction limits when more than one individual is checked in at a specific location via a social network.

Further aspects relate to compensating consumers to remain in a specific location (or continue to browse a particular website). The compensation may be through direct electronic payments, discounts, an increased credit limit, or another incentive. According to some implementations, the incentive may increase over time (e.g., the longer the consumer performs the action, the greater the incentive). In an additional or alternative implementation, the incentive may increase based on one or more friends (family members or other associated people) being in the same physical location or browsing a website and determined to be associated with the consumer.

Figure 1:
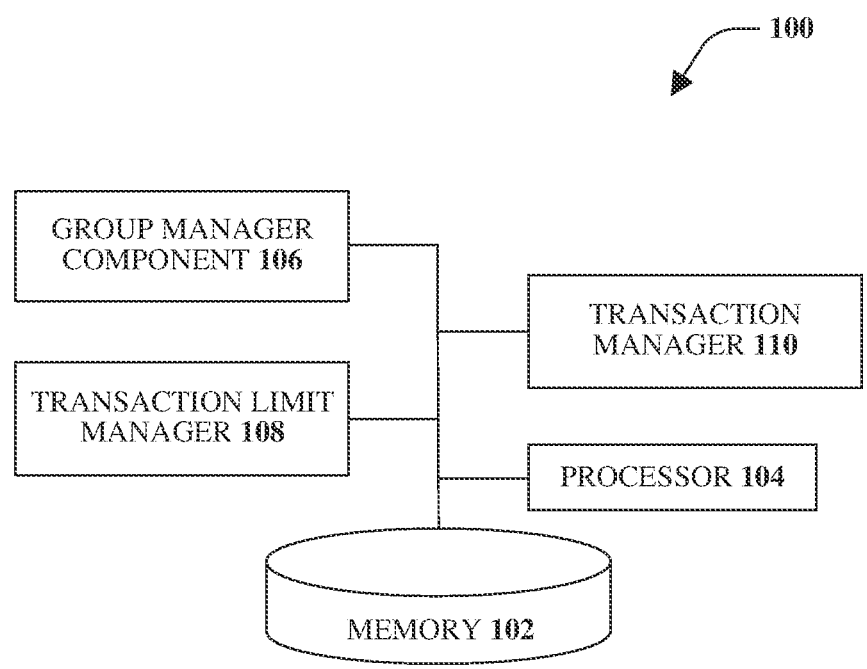
FIG. 1 illustrates an example, non-limiting system configured to provide tandem purchasing, according to an aspect.

FIG. 1 illustrates an example, non-limiting system 100 configured to provide tandem purchasing, according to an aspect. The various aspects provided herein provide the ability for couples and groups to set up transactions that may only occur when all parties (or a subgroup) within the group are co-located in the same place, or otherwise are determined to be working in tandem to conduct a transaction (e.g., a financial transaction, a purchase, and so on).

For example, the co-location may be triggered when all of the individuals within that group (or at least a predetermined number of members) use a social network in order to capture their location. The social network, in turn, uses proximity and place co-location in order to determine the presence of an individual in that location. Once the social network provides proof that all of the parties determined to be part of the group have checked into that location, the tandem spending limit is invoked. In an implementation, a balance for the transaction may be established for the group, and if any of the group members make a purchase while the group is physically together (or located remotely but determined to be operating together), the amount of that transaction may be deducted from the balance. In this manner, all purchases made by the group in total may not exceed the budget set by the group creator or another entity authorized to restrict one or more parameters of the tandem purchase (e.g., a financial entity).

The system 100 may include at least one memory 102 that may store computer executable components and/or computer executable instructions. The system 100 may also include at least one processor 104, communicatively coupled to the at least one memory 102. The at least one processor 104 may facilitate execution of the computer executable components and/or the computer executable instructions stored in the at least one memory 102. The term "coupled" or variants thereof may include various communications including, but not limited to, direct communications, indirect communications, wired communications, and/or wireless communications.

It is noted that although the one or more computer executable components and/or computer executable instructions may be illustrated and described herein as components and/or instructions separate from the at least one memory 102 (e.g., operatively connected to the at least one memory 102), the various aspects are not limited to this implementation. Instead, in accordance with various implementations, the one or more computer executable components and/or the one or more computer executable instructions may be stored in (or integrated within) the at least one memory 102. Further, while various components and/or instructions have been illustrated as separate components and/or as separate instructions, in some implementations, multiple components and/or multiple instructions may be implemented as a single component or as a single instruction. Further, a single component and/or a single instruction may be implemented as multiple components and/or as multiple instructions without departing from the example embodiments.

The system 100 may also include a group manager component 106 that may be configured to determine one or more users that belong to a group. According to some implementations, a single user may belong to two or more groups, each having different individual transaction limits and different tandem transaction limits. For example, a man may be included in a first group that comprises him and his wife. The man may also be included in a second group that includes him, his wife, his son, and his daughter. Further, the man may be included in a third group that includes members of his team at work (e.g., he is included in the group with his four employees).

The group manager component 106 may be configured to identify the one or more users based on data indicative of the user. For example, the group manager component 106 may be configured to receive a first identification indicative of a first user, a second identification indicative of a second user, and a subsequent identification indicative of a subsequent user. The identification indicative of the users may be a set of data that provides information related to the user (e.g., name, location, preferences, and so on).

Also included in the system 100 may be a transaction limit manager 108 that may be configured to dynamically revise transaction limits based on a status of group members in relation to each other. The transaction limit manager 108 may be configured to establish individual transaction limits for each user. For example, the transaction limit manager 108 may be configured to establish a first individual transaction limit for a first user, a second individual transaction limit for a second user, and a subsequent transaction limit for a subsequent user. Further, the transaction limit manager 108 may be configured to establish a joint or tandem transaction limit for a combination of the users in the group. According to some implementations, the tandem transaction limit may be a value that is more than a combination of the individual transaction limits. In accordance with other implementations, the tandem transaction limit may be a value that is less than a combination of the individual transaction limits.

Also included in the system 100 may be a transaction manager 110 that may be configured to implement a tandem transaction based on conformance with one or more parameters of the tandem transaction. For example, if at least a threshold number of users within a group have been determined to be performing a joint transaction, or are capable of performing a joint transaction, the tandem transaction limit may be activated by the transaction manager 110 for a threshold amount of time. This threshold amount of time may be configurable based on the type of transaction (e.g., a car purchase versus a television purchase), an entity with which the transaction is being performed, and so on. Tandem transactions, at the tandem transaction level, may be performed before expiration of the threshold time. After expiration of the time limit, the transaction limit manager 108 may be configured to dynamically revoke the tandem transaction limit and apply the respective individual transaction limits to each member of the group. As desired, the members may indicate their desire to re-implement a tandem transaction, such as by checking-in to the location again.

The following provides example use-case scenarios that may be facilitated through the disclosed aspects. The first example relates to a chain retail store. In this example, a wife would like to manage her household budget and sets up a rule that both her and her husband have a personal spending limit of $100 per transaction when they are apart, however they have a tandem spending limit of $2000 when they are together, thus ensuring they both need to be checked into the same location when they are to make large purchases. The husband goes to a chain retail store to look at a big screen TV, however he cannot purchase it since his personal spending limit is too low. He calls his wife to join him and she checks into that location as well. They both receive a text that their transaction limit for the next hour is $2000. They purchase a TV for $1200, thus leaving $800. When they leave the location, determined by a check in at another location, or the time limit expires, each of their spending limits returns to $100.

In an ecommerce example, the husband and the wife of the above example decide instead to purchase the TV from chain retail store online. She is at work in a first city and he is at work in a second city. They load their tandem purchasing application, which is a customized shared browser which allows one or the other of them to "drive" the browsing. While they are both in the application, their tandem purchasing limit goes from $100 each to $2000 together. They decide on a TV, and when the transaction is about to take place, the application requests a touch id (or special code) from both of them in order to process the transaction. They are both in the same "virtual" place.

The next example relates to small business budget tracking. A manager provides a corporate debit card to an employee, which the employee uses to purchase office supplies from a local electronics and office supply store. The transaction limit for just the employee on her own is $100. However, in some cases, the manager will need to join the employee at the store in order to purchase computers or computer accessories. He sets the tandem spending limit to $5000 when they are both in the store (or virtually shopping) so that he and/or his employee may purchase additional workstations for the company. He may freely send the employee to an office supply store to purchase paper and toner, but he will need to be there as well (or remotely reviewing the purchase) in order for them to purchase a laser printer or desk for the office.

The following example relates to two roommates that are buying furniture. The two roommates would like to redecorate their living room so they decide to each chip in up to $500 towards same new furnishings at a furniture supply store. One of the roommates is a big spender and the other one is frugal, so the frugal one has the other roommate agree to the limit, and that they both need to be checked into the location at the same time in order for them to make purchases.

Figure 2:
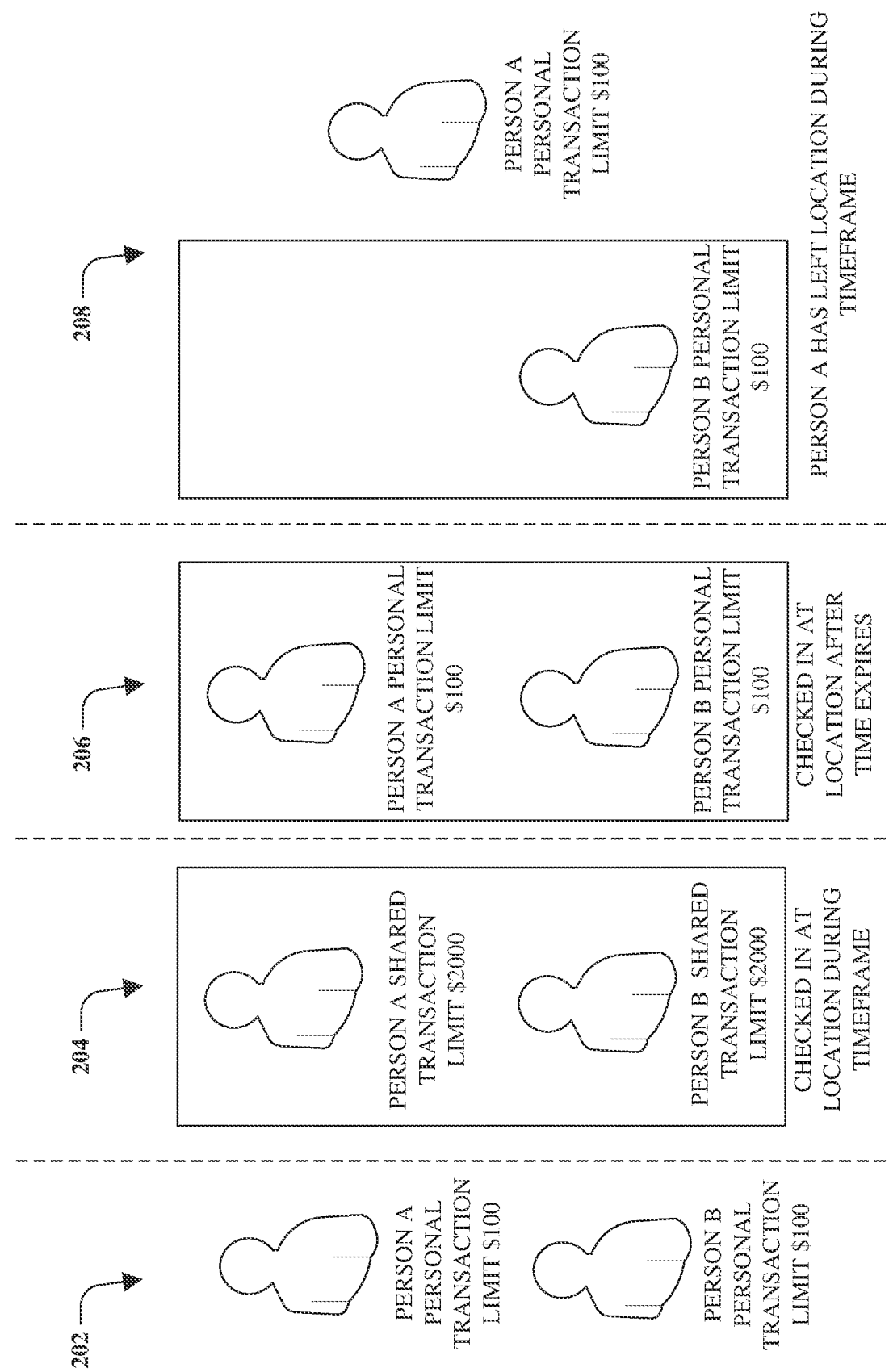
FIG. 2 Illustrates statuses of transaction limits for group members, according to an aspect.

By way of example and not limitation, FIG. 2 Illustrates statuses of transaction limits for two people (labeled as Person A and Person B), according to an aspect. At 202, Person A and Person B are in different locations and a personal spending limit of $100 is applied to each of them individually. At 204, Person A and Person B both use their social network app to check into a specific location (or otherwise indicate a tandem purchase). A "check in" refers to a user announcing their arrival (or presence) at a particular location. Thus, the system resets their tandem spending limit to $2000.

Continuing this example, as illustrated at 206, Person A and Person B are both at the location and checked in, however, the time frame has expired. In this case, the system resets their spending limits to $100 each (e.g., individual spending limits). Alternatively, at 208, Person A leaves the location within the time frame (e.g., before expiration of the time period). In this situation, the system resets their spending limits to $100 each (e.g., individual spending limits).

Figure 3:
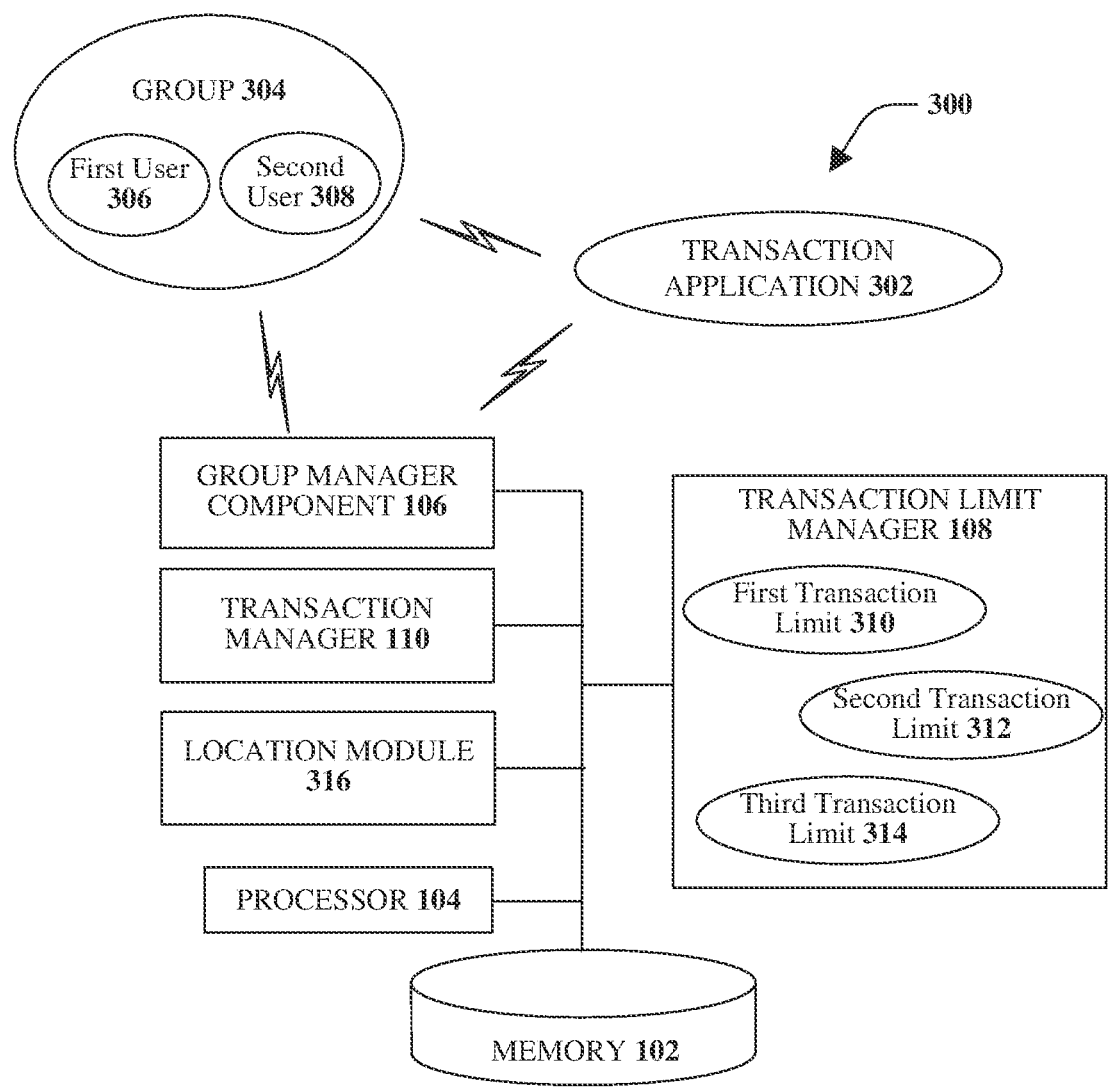
FIG. 3 illustrates an example, non-limiting system for identifying groups able to perform tandem transactions, according to an aspect.

FIG. 3 illustrates an example, non-limiting system 300 for identifying groups able to perform tandem transactions, according to an aspect. One or more groups may be identified based on manual selection by group leaders through respective devices. In some implementations, one or more groups may be identified based on predefined joint account holders or through other manners of identification (e.g., persons identified as family members, friends, associates, contacts within a social media network, an email network, or through other manners of electronic association, and so on).

The system 300 may be implemented through a transaction application 302, which may be downloaded on respective devices of members of the groups. A device may also be called, and may contain some or all of the functionality of a system, subscriber unit, subscriber station, mobile station, mobile, mobile device, wireless terminal, device, remote station, remote terminal, access terminal, user terminal, terminal, wireless communication device, wireless communication apparatus, user agent, user device, or user equipment (UE). A mobile device may be a cellular telephone, a cordless telephone, a Session Initiation Protocol (SIP) phone, a smart phone, a feature phone, a wireless local loop (WLL) station, a personal digital assistant (PDA), a laptop, a handheld communication device, a handheld computing device, a netbook, a tablet, a satellite radio, a data card, a wireless modem card, and/or another processing device for communicating over a wireless system. Further, although discussed with respect to wireless devices, the disclosed aspects may also be implemented with wired devices, or with both wired and wireless devices.

The group manager component 106 may be configured to determine a group 304 that includes a first identification indicative of a first user 306 and a second identification indicative of a second user 308. Although the various aspects are discussed herein with respect to a group that includes two members, a group may include more than two members. Further, a member may be included in two or more groups, which may have at least a subset of the members in common between the two groups, or may be comprised of different members (e.g., only one member is included in both of the two groups).

The information indicative of the users may include information that identifies the users and their respective devices and, further, the users may be identified based on information received from their respective devices. For example, each user may sign into respective social media applications using their respective credentials. These credentials may be utilized to identify the members. In another example, device identification may be utilized to identify the members. Device identification may include, but is not limited to, a Temporary Mobile Subscriber Identity (TMSI), an International Mobile Subscriber Identity (IMSI), and Internet Protocol (IP) address, and so on. Other manners of identifying the members may also be utilized.

The transaction limit manager 108 may be configured to establish a first transaction limit 310 for the first user 306, a second transaction limit 312 for the second user 308, and a third transaction limit 314 for a combination of the first user 306 and the second user 308. For example, the first transaction limit 310 may be utilized by the first user 306 when conducting transactions; the second transaction limit 312 may be utilized by the second user 308 when conducting transactions; and the third transaction limit 314 may be utilized for a tandem transaction being conducted by both the first user 306 and the second user 308. According to some implementations, the amount of the various transactions are deducted from the applicable transaction limit. For example, when the second user 308 individually performs a transaction, the second transaction limit 312 is adjusted accordingly (e.g., limit reduced for a purchase, limit increased for a return or other type of account credit).

Further, when both users are performing a transaction, the third transaction limit 314 is adjusted accordingly (e.g., the amount of a purchase is reduced from the third transaction limit 314, the amount of a credit is added to the third transaction limit 314, which may be based on temporal and/or time parameters). In accordance with some implementations, the individual transaction limits may represent a total amount of purchases that may be made for an identified period of time (e.g., one month).

The transaction manager 110 may be configured to apply the third transaction limit 314 based on a determination that the first user 306 and the second user 308 are performing a joint transaction. In order to make this determination, a location module 316 may be configured to determine the location of each member of the group (e.g., the first user 306 and the second user 308). The location module 316 may receive the location of each member based on check-ins associated with a social media application. Thus, the location module 316 may receive an indication that the first user 306 and the second user 308 have indicated their presence at a common location through a social media interface. For example, when a member (e.g., the first user 306) arrives at a location, the first user 306 may check into her social media application to allow others (e.g., her friends or acquaintances) to know her current location. This allows others to join her or to know her activities and/or her favorite locations, or to provide a travel itinerary or personal diary.

In accordance with some implementations, the location module 316 may determine the respective locations based on a global positioning system or other location system executing on the users' respective devices. In this implementation, the location module 316 may be configured to receive an indication that the first user and the second user have indicated their presence at a common location based on respective location indications. At about the same time as the location is determined, the user device may communicate that information to the location module 316. According to some implementations, the users may be located in different areas (e.g., two different cities), but the location is considered to be a common location (e.g., a same store in two different cities).

Additionally or alternatively, one or more members of the group, rather than being physically at the location, may be virtually browsing a website associated with a location. There may be limits established where the user has to use a preregistered device, not a device located at a public library, for example. Thus, the location module 316 may be configured to receive an indication that the first user is physically at a location and another indication that the second user is browsing a website associated with the location. In some implementations, all of the members of the group may be browsing the website (e.g., none of the users are physically at the location). Thus, the location module 316 may be configured to determine the first user is browsing a website on a first device and the second user is browsing the website on a second device. In such a manner, a tandem transaction may be performed by two or more users even in the case where the users are not able to travel, or do not desire to travel to a common location.

Figure 4:
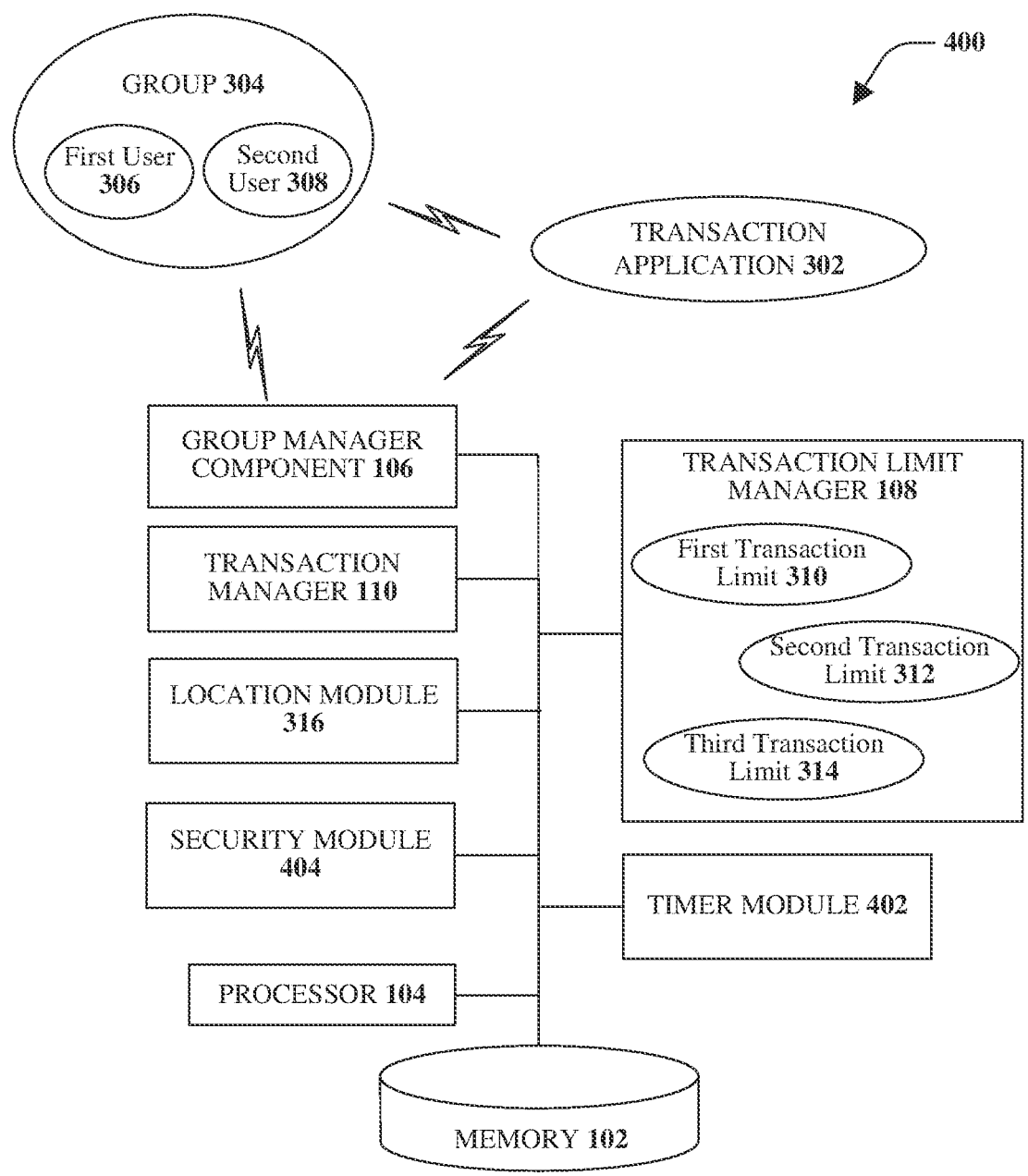
FIG. 4 illustrates an example, non-limiting system configured to apply a tandem transaction limit to a set of group members during a defined time interval, according to an aspect.

FIG. 4 illustrates an example, non-limiting system 400 configured to apply a tandem transaction limit to a set of group members during a defined time interval, according to an aspect. The group 304 may include two or more member (identified as a first user 306 and a second user 308). In order to perform a joint transaction, at least a subset of the group members should be participants of the joint transaction. For example, a group may include five users and, the group manager component 106 may allow the joint transaction if at least three of the members are participants. The threshold number of group members that should participate in the joint transaction may be determined at about the same time as the group is established, or at a different time through configurable settings accessible through the transaction application 302. According to some implementations, the threshold number of members may be determined based on parameters of the transaction (e.g., a credit card agreement).

To establish the group, a group creator may activate the transaction application 302 on his device. The transaction application 302 may be a mobile application, a feature added to a currently existing mobile application, a website, a feature added to an existing website, and so on.

Through the transaction application 302, the group creator may select others that should be included in the group. According to some implementations, the group creator may establish transaction limits for the group and the individual members in the group. However, according to some implementations, the transaction limits are established by a financial entity and enforced by the transaction limit manager 108. The transaction information may be communicated to a cloud-based back end (e.g., the system 400) for enforcement of the transaction limits.

As used herein a "financial entity" refers to a financial institution, such as a bank, persons operating on behalf of the financial institution, and/or communication devices managed by the financial institution and/or the persons operating on behalf of the financial institution. Additionally or alternatively, the financial entity may be a third party monitoring source or another type of entity that has a trusted relationship with the financial institution.

While the group members are operating independently, the individual transaction limits are applied by the transaction limit manager 108. When it is determined that at least a threshold number of group members are in a condition to operate jointly, the joint transaction limit is applied to those members.

In some cases, the members may be identified as being in condition to operate jointly based on the members checking-into a social media application. Since, the user has to manually select the check-in option, there may be times when the user has checked into a particular location and, thereafter, does not check-into a subsequent location. Further, if the user-checks in and then leaves, the user might not be checked-out of the location. Therefore, it may indicate that the user is at a particular location when the user is not physically located there. Accordingly, a timer module 402 may be configured to apply a time limit to a joint transaction.

For example, when the threshold number of group members have check into a location, it may be determined that those members are in condition to perform a joint transaction. Based on this determination, the timer module 402 may set a timer that provides a limited duration during which the joint transaction may occur. If the timer expires before that transaction occurs, the joint transaction limit is revoked and each member is returned to their individual transaction limits. The joint transaction may be reestablished if the group members re-check-into the location. Otherwise, the joint transaction is denied.

In other implementations, one or more group member in condition to perform the joint transaction may be virtually browsing a website. In this case, the timer module 402 may require the one or more group members to select a button or icon on their display screen (or through another user interface) in order to confirm acceptance of the joint transaction. If the threshold number of group members do not acknowledge the transaction within a duration established by the timer module 402, the joint transaction is revoked.

According to some implementations, a user may solicit acceptance and acknowledgement of a transaction from one or more other members (e.g., the threshold number of members). In this case, a prompt or message may be sent to the other member(s). If acknowledgement is received from the other member(s) within a limited time period (as established by the timer module 402), the transaction using the joint transaction limit is allowed. If the other member(s) do not accept/acknowledge the transaction within the duration of the time limit, the joint transaction limit is revoked and the individual transaction limit is reapplied to the individuals in the group.

According to some implementations, the security level of the social media application is utilized to confirm the identity of the group members. However, in some implementations, additional security may be applied by a security module 404. For example, the group members may be identified based on credentials (e.g., a login/password pair, biometric identification, and so on). The group members may input the additional security information into interface components of their respective devices.

According to some implementations, the interface components (as well as other interface components discussed herein) may provide a graphical user interface (GUI), a command line interface, a speech interface, Natural Language text interface, and the like. For example, a Graphical User Interface (GUI) may be rendered that provides a user with a region or means to load, import, select, read, and so forth, various requests and may include a region to present the results of the various requests. These regions may include known text and/or graphic regions that include dialogue boxes, static controls, drop-down-menus, list boxes, pop-up menus, as edit controls, combo boxes, radio buttons, check boxes, push buttons, graphic boxes, and so on. In addition, utilities to facilitate the information conveyance, such as vertical and/or horizontal scroll bars for navigation and toolbar buttons to determine whether a region will be viewable, may be employed. Thus, it might be inferred that the user did want the action performed.

The user may also interact with the regions to select and provide information through various devices such as a mouse, a roller ball, a keypad, a keyboard, a pen, gestures captured with a camera, a touch screen, and/or voice activation, for example. According to an aspect, a mechanism, such as a push button or the enter key on the keyboard, may be employed subsequent to entering the information in order to initiate information conveyance. However, it is to be appreciated that the disclosed aspects are not so limited. For example, merely highlighting a check box may initiate information conveyance. In another example, a command line interface may be employed. For example, the command line interface may prompt the user for information by providing a text message, producing an audio tone, or the like. The user may then provide suitable information, such as alphanumeric input corresponding to an option provided in the interface prompt or an answer to a question posed in the prompt. It is to be appreciated that the command line interface may be employed in connection with a GUI and/or Application Program Interface (API). In addition, the command line interface may be employed in connection with hardware (e.g., video cards) and/or displays (e.g., black and white, and Video Graphics Array (EGA)) with limited graphic support, and/or low bandwidth communication channels.

Figure 5:
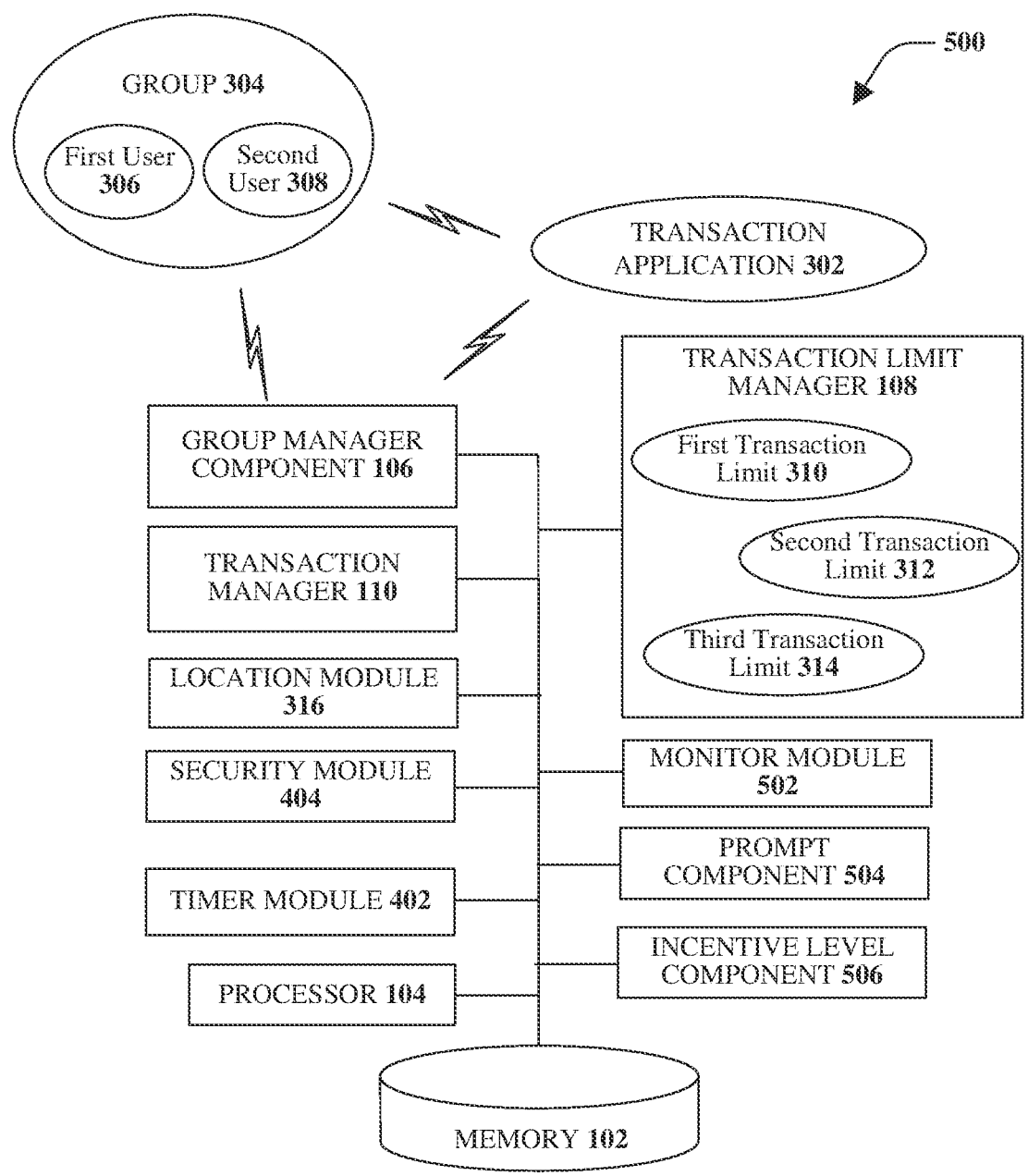
FIG. 5 illustrates an example-non-limiting system that incentives one or more users, according to an aspect.

FIG. 5 illustrates an example-non-limiting system 500 that incentives one or more users, according to an aspect. The incentive may be to remain in a defined location for a threshold amount of time and/or may be to increase a number of persons in the defined location.

Ecommerce is a common form of commerce and brick-and-mortar retailers and malls are developing new reasons for customers to visit their locations and malls in person. Once in the retail location, the longer the customer stays in the location, the more chances that the customer will make a purchase. Thus, the system 500 may be configured to provide an incentive to a user to physically remain in a location (e.g., browsing a retail store, browsing stores at a shopping mall, and so forth) or to continue browsing a particular website for more than a threshold browse time. Additionally or alternatively, the system 500 may be configured to provide the incentive, or another incentive, based on the number of associated users (e.g., joint account holders, family members, friends, business associates, other social acquaintances, and so on) that are with the user at the store or determined to be browsing a website at substantially the same time as the user. The incentive may be through direct electronic payment, discounts, free product/service offers, other monetary incentives, or other types of incentives (e.g., VIP service, advance notice of sales, ability to purchase sales items before other customers, and so on).

The system 500 may include a monitor module 502 that may be configured to evaluate an amount of time that a user physically spends at an identified retail establishment. According to an implementation, the time spent may be based on a determination of when the user checks into the location (e.g., through a social media application) until the user checks into another location. In other implementations, the determination may be made based on an actual location of the user (e.g., the user device), such as through a global positioning system or another type of location determiner.

In an implementation, a prompt component 504 may be configured to ask the user to recertify their location. For example, the user may be prompted to re-check-in at their current location. The prompt may be output to the user at substantially the same time as an expiration of a threshold browse time, which may be determined by the timer module 402. If the user re-checks into the same (or similar) location, or if the determination (e.g., based on other manners of determining the current location of the user) is that the user is still at the retail location, a first incentive may be given to the user.

According to some implementations, an incentive level component 506 may be configured to provide an increasing amount of incentive or rewards. For example, a threshold browse time may be utilized as the time limit for the user re-checking-into the location (or the system 500) automatically determining the user's current location. If the user is at the same or similar location at a first threshold browse time, the incentive level component 506 notifies the user that a first incentive has been received. If the user is still at the same (or similar) location (as determined in a similar manner), the incentive level component 506 may output a second incentive, which may have a value higher than the first incentive, or may be in addition to the first incentive. This increase in the amount or number of incentives may be provided by the incentive level component 506 up to a maximum level, which may be predefined by the retail entity that is providing the incentive.

In some implementations, the monitor module 502 may be configured to track the amount of time that the user browses a website associated with an identified retail entity. The monitor module 502 may track what the user is doing on their device. Further, the prompt component 504 may output a notification to the user (e.g., to click an icon or response to the prompt) to determine if the user is still active on the website, or whether the user has simply left the browser open on their device and walked away. If the response from the user is positive, the determination is that the user is still browsing the website and the incentive level component 506 may output the appropriate incentive.

According to an additional or alternative implementation, the monitor module 502 may be configured to determine other users, related to the user, are physically with the user at the retail location. In this implementation, the prompt component 504 may be configured to communicate a notification to each of the related users to re-check-into the location (or the location of the users may be determined through other manners). If one or more users are still together, the incentive level component 506 may output an incentive to the user and/or at least one of the other users.

According to some implementations, the incentive level component 506 may determine a number and a level of incentives based on a number of users that are together. For example, a threshold number of contacts may be identified by the retail entity and additional incentives may be provided based on the number of contacts. For example, a first incentive may be provided based on two associated users being together, a second incentive may be provided based on three associated users being together, and so on.

In the situation where one or more users are located remotely (e.g., browsing a website associated with a retail entity), the prompt component 504 may output the notification to determine if the one or more users are still active on the website, or are no longer active. If still active, one or more incentives may be provided by the incentive level component 506.

According to some implementations, additional offers may be generated. These additional offers may be used at next visit within a time boxed period once an offer has been redeemed.

In some implementations, offers may be made in cash instead of discounts. Instead of offering a percentage or cash discount on a purchase, the retailer may pay the shopper directly into their electronic wallet. As the shopper arrives at the location, the shopper may receive a notification that they now have received an amount from the retailer in their electronic wallet. This amount may either be an alternative currency which may only be used at that location, or a straight up cash gift which may be used anywhere, as a reward for simply visiting that location.

In an additional or alternative implementation, offers may be keyed based on which of the shopper's friends came to that location. A "social score" may be calculated to determine the value of specific friends who may be called to the location and different offers may be presented depending on the individuals who come to the location. The "social score" may be calculated by a website and/or social application that uses social media analytics to ranks it users according to online social influence. For example, someone with a higher social score coming to the location might provide the shopper with a better discount or higher gift than would be given for people they knew that have a lower social score.

In still another implementation, the social connections may be chained or linked. For example, when a shopper brings someone to the location, and they bring someone else on their friend's friends list to the location. In this case, the offer might be greater for the original shopper.

Figure 6:
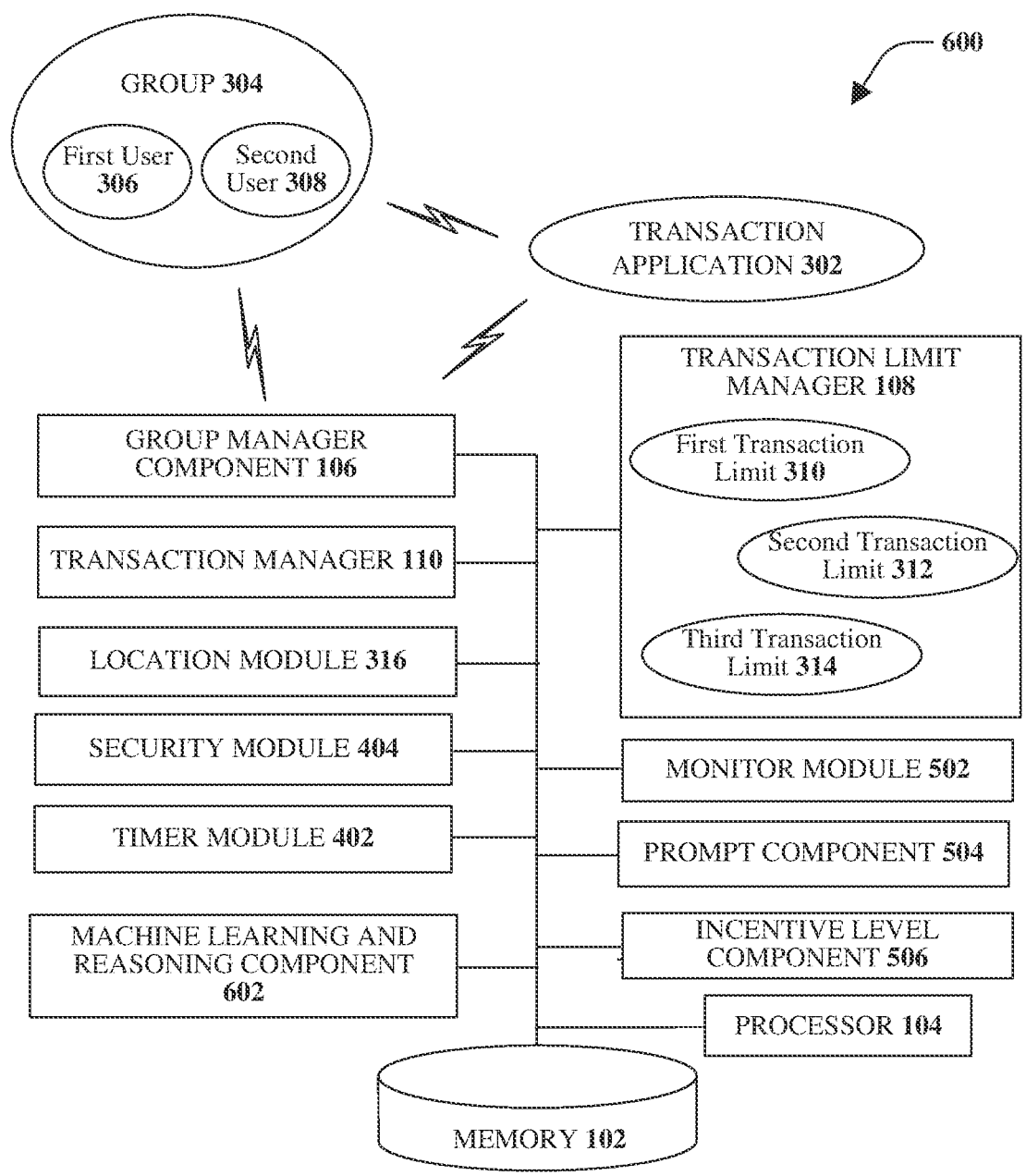
FIG. 6 illustrates an example, non-limiting system that employs automated learning to facilitate one or more of the disclosed aspects.

FIG. 6 illustrates an example, non-limiting system 600 that employs automated learning to facilitate one or more of the disclosed aspects. For example, a machine learning and reasoning component 602 may be utilized to automate one or more of the disclosed aspects. The machine learning and reasoning component 602 may employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 602 may employ principles of probabilistic and decision theoretic inference. Additionally or alternatively, the machine learning and reasoning component 602 may rely on predictive models constructed using machine learning and/or automated learning procedures. Logic-centric inference may also be employed separately or in conjunction with probabilistic methods.

The machine learning and reasoning component 602 may infer members that should belong to a particular group, an individual transaction limit for each member in the group, a tandem transaction limit for the group, a threshold number of members that should be jointly performing the transaction, when to offer an incentive, when to offer an increased (or an addition) incentive, and so on. Based on this knowledge, the machine learning and reasoning component 602 may make an inference based on trigger events determined based on a threshold number of group members being co-located or otherwise performing an action together, a time limit for performing a transaction together, historical information associated with the group members, historical information associated with each person included in the group, and so on.

As used herein, the term "inference" refers generally to the process of reasoning about or inferring states of the system, a component, a module, the environment, and/or customers (or devices associated with the customers) from a set of observations as captured through events, reports, data, and/or through other forms of communication. Inference may be employed to identify a specific context or action, or may generate a probability distribution over states, for example. The inference may be probabilistic. For example, computation of a probability distribution over states of interest based on a consideration of data and/or events. The inference may also refer to techniques employed for composing higher-level events from a set of events and/or data. Such inference may result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) may be employed in connection with performing automatic and/or inferred action in connection with the disclosed aspects.

The various aspects (e.g., in connection with facilitating a collaborative transaction) may employ various artificial intelligence-based schemes for carrying out various aspects thereof. For example, a process for determining individual transaction limits, joint transaction limits, one or more conditions when a threshold number of group members are performing a joint transaction, when to provide an incentive to one or more users and the conditions for the inventive, and so on may be enabled through an automatic classifier system and process.

A classifier is a function that maps an input attribute vector, x=(x1, x2, x3, x4, xn), to a confidence that the input belongs to a class. In other words, f(x)=confidence(class). Such classification may employ a probabilistic and/or statistical-based analysis (e.g., factoring into the analysis utilities and costs) to prognose or infer an action that should be employed to determine what transactions should be processed as joint transactions, which transactions should be individual transactions, when to automatically apply a joint transaction limit, when to automatically apply an individual transaction limit, and so on. In the case of tandem transactions, for example, attributes may be the presence of key group members and/or a threshold number of members and the classes may be a duration of a time limit and/or a remaining transaction balance.

A support vector machine (SVM) is an example of a classifier that may be employed. The SVM operates by finding a hypersurface in the space of possible inputs, which hypersurface attempts to split the triggering criteria from the non-triggering events. Intuitively, this makes the classification correct for testing data that may be similar, but not necessarily identical to training data. Other directed and undirected model classification approaches (e.g., naïve Bayes, Bayesian networks, decision trees, neural networks, fuzzy logic models, and probabilistic classification models) providing different patterns of independence may be employed. Classification as used herein, may be inclusive of statistical regression that is utilized to develop models of priority.

One or more aspects may employ classifiers that are explicitly trained (e.g., through a generic training data) as well as classifiers that are implicitly trained (e.g., by observing user locations, by receiving extrinsic information, and so on). For example, SVM's may be configured through a learning or training phase within a classifier constructor and feature selection module. Thus, a classifier(s) may be used to automatically learn and perform a number of functions, including but not limited to determining according to a predetermined criteria when a condition for a joint transaction is satisfied, when to automatically apply a joint transaction limit and to which group members the joint transaction limit applies, and so forth. The criteria may include, but is not limited to, similar transactions, historical information, current information, group member attributes, and so forth.

Additionally or alternatively, an implementation scheme (e.g., a rule, a policy, and so on) may be applied to control and/or regulate which transactions should have a joint transaction limit applied and which transactions should have an individual transaction limit applied. In some implementations, based upon a predefined criterion, the rules-based implementation may automatically and/or dynamically interpret attributes associated with each transaction. In response thereto, the rule-based implementation may automatically interpret and carry out functions associated with the transactions by employing a predefined and/or programmed rule(s) based upon any desired criteria.

Methods that may be implemented in accordance with the disclosed subject matter, will be better appreciated with reference to the following flow charts. While, for purposes of simplicity of explanation, the methods are shown and described as a series of blocks, it is to be understood and appreciated that the disclosed aspects are not limited by the number or order of blocks, as some blocks may occur in different orders and/or at substantially the same time with other blocks from what is depicted and described herein. Moreover, not all illustrated blocks may be required to implement the disclosed methods. It is to be appreciated that the functionality associated with the blocks may be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods might alternatively be represented as a series of interrelated states or events, such as in a state diagram.

Figure 7:
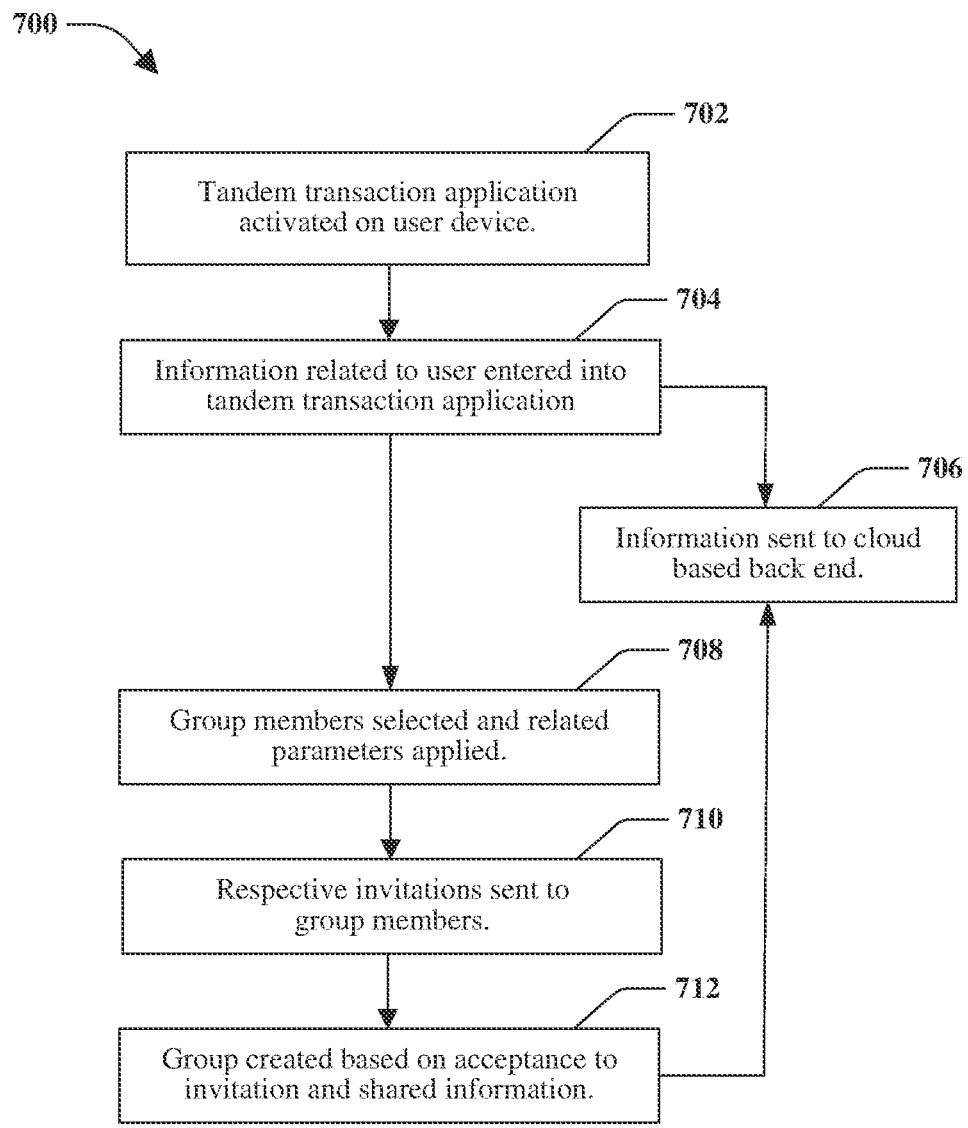
FIG. 7 illustrates an example, non-limiting method for establishing a group for tandem purchasing, according to an aspect.

FIG. 7 illustrates an example, non-limiting method 700 for establishing a group for tandem purchasing, according to an aspect. The method 700 in FIG. 7 may be implemented using, for example, any of the systems, such as the system 100 (of FIG. 1), described herein.

At 702, a user opens a transaction application on their device. To open the transaction application, the user would have already downloaded the mobile application on their device, or have accessed a website that allows the user to set up the application.

At about the same time as the transaction application is opened, information related to the user is entered at 704. Thus, a prompt may be output for the user to log into to the application. According to some implementations, the user might log into the application using social network credentials. The user may use either their own social network or other networks that interconnect. According to other implementations, other manners of entering security credentials may be utilized with the disclosed aspects.

After the user has been validated with the transaction application, various accounts may be associated with the user. For example, the user may connect bank accounts, credit cards, debit cards, and so on to their account with the transaction application. Alternatively or additionally, information related to one or more accounts that should be associated with the user may be dynamically determined (e.g., determined by the user device, the transaction application, and so on). For example, the account(s) may be automatically determined based on an online bank login.

After the information related to the user has been gathered, the information may be electronically communicated to a cloud-based back end system, at 706. This back end system may be hosted by the financial entity or by a trusted third-party.

At 708, one or more other users may be selected to join the group. The user that is creating the group may select the other members in their social circle, such as by reviewing their friends list in their social network. The selected member may be added to the group. If more members should be added to the group, those members may also be selected and added to the group.

Related parameters for the one or more other group members may be added. For example, personal limits (e.g., personal spending limits) may be established for each member. Further, a tandem spending limit may be selected for the group. The personal limits and tandem spending limit may be different limits. For example, a first member and a second member may have spending limits of $100, a third member may have a spending limit of $200, and when all three members constitute a group (e.g., tandem purchase) the spending limit may be $1,500.

Related parameters may also be a time window or time limit, wherein after expiration of the time limit, the tandem purchase is reverted to an individual purchase. For example, if the group checks into a common location (e.g., a mutual location), it may be deemed that all of the group members are present and are have met requirements to perform a tandem transaction and, a timer is started. After expiration of the time limit, the tandem transaction is no longer satisfied. In order to reactivate the tandem transaction, the members need to recheck into the common location.

When a member has been added to the group, at 710, the member(s) are sent a registration/agreement link. This link may be sent through messaging embedded in the social network. However, the disclosed aspects are not limited to this implementation and other manners of transmitting a registration/agreement link may be utilized.

At 712, the additional member(s) accept the invitation to the group. If the initial member and the added member share the same financial information (e.g., joint account holders, joint users on a credit card, and so on), the member is added to the group. In some cases, the accepting member may add their own financial information in order to log into the application. Once the group creator has completed creating the group, the group may be saved. Further, this information may be transmitted to the cloud based back end.

Figure 8:
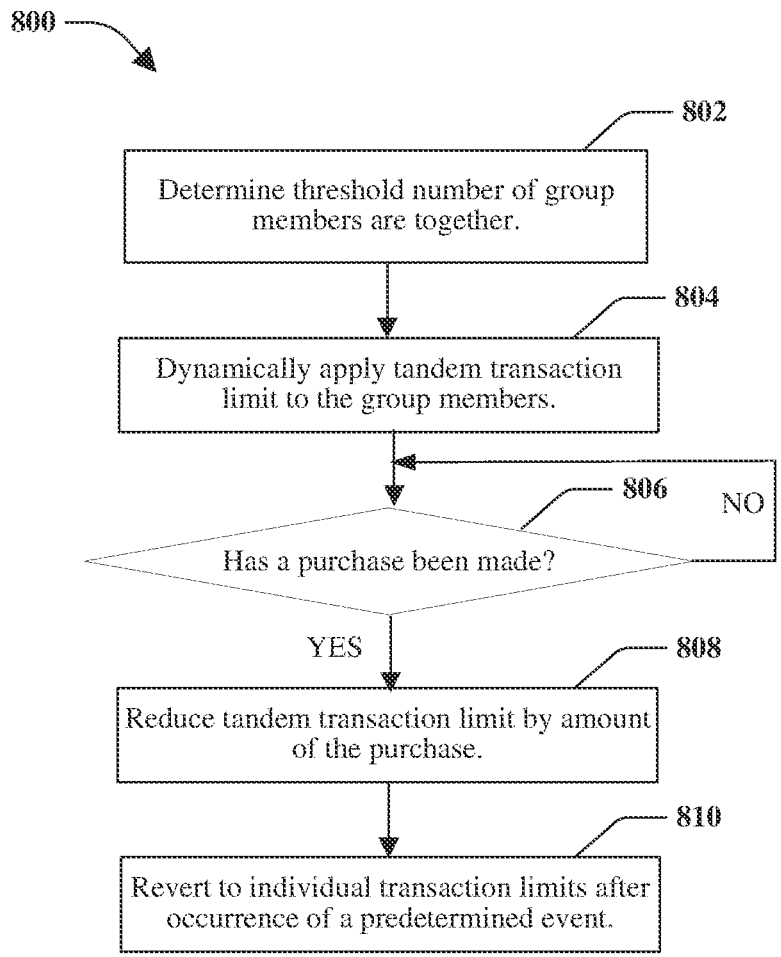
FIG. 8 illustrates an example, non-limiting method for operation of a tandem transaction application, according to an aspect.

FIG. 8 illustrates an example, non-limiting method 800 for operation of a transaction application, according to an aspect. The method 800 in FIG. 8 may be implemented using, for example, any of the systems, such as the system 300 (of FIG. 3), described herein.

The method 800 starts at 802 when transaction limits are dynamically applied based on a location of the members in the group. For example, each member may check into a social media network, which indicates a location of each member. If each member is identified as being in substantially the same location, it indicated the members are together. However, the disclosed aspects are not limited to this implementation. Instead, other manners of determining whether the group members are operating in conjunction may be utilized.

For example, according to an implementation, one group member may be located in a national chain store in a first city (or state), while a second group member is located in the same national chain store in a second city (or state). This might be the case when one of the members is traveling and is in a brick and mortar store and found something that the other member is interested in purchasing. For example, a wife may be traveling on business and went into a large chain store to purchase some needed items. While there, she walks by the electronics section and notices that a large-screen television is on sale. She calls her husband and he decides to go to the same chain store that is located near their house so that he may purchase the item. They both go back to the store where they are located and check-in to their respective devices. Even though these people are not physically together, they are considered to be performing a tandem purchase because they are in the same retail store (e.g., a common location).

In another example, the wife may be in the store and the husband is using his mobile device to check the store's website. The transaction application determines that this is a tandem purchase because of the location of the wife and the website being viewed by the husband. This is considered a common location because the physical location of the wife and the remote location of the husband have at least one predetermined commonality (e.g., they are both owned by the same chain retail store).

In a further example, the group members may be viewing an electronic website on their respective devices. The group members may be located in a similar location (e.g., home, work place, and so on). However, in some implementations, the group members may be located in disparate location (e.g., across town, in different cities, in different states). In either case, the tandem purchase may be determined based on timing of respective selections on the group members through the electronic website due to their disparate locations.

At 804, the tandem transaction limit is dynamically applied to the subset of group members. Thus, prior to the group members being determined to be together, each member of the group has a spending limit that is based on their individual spending limit. However, at about the same time as the subset of group members are together, the spending limit is changed from the individual spending limit to the tandem spending limit. The tandem spending limit may be more than a combination of the individual spending limits. However, according to some implementations, the tandem spending limit may be less than a combination of the individual spending limits.

The tandem transaction limit may be available to any member of the group determined to be engaging in the tandem purchase. Thus, at 806 a determination is made whether a purchase has been made (prior to expiration of a time limit). If a purchase is not made ("NO"), the method 800 returns to 806 until a determination is made whether a purchase has been made (or the time limit expires). If a purchase is made ("YES") the amount of the purchase is deducted from the tandem transaction limit, at 808. Subsequent purchases may be made, at 810, provided the subset of group members are at the same location and a time limit has not expired. If either or both event occurs, the transaction limit is dynamically changed from the tandem transaction limit to the individual transaction limit.

Figure 9:
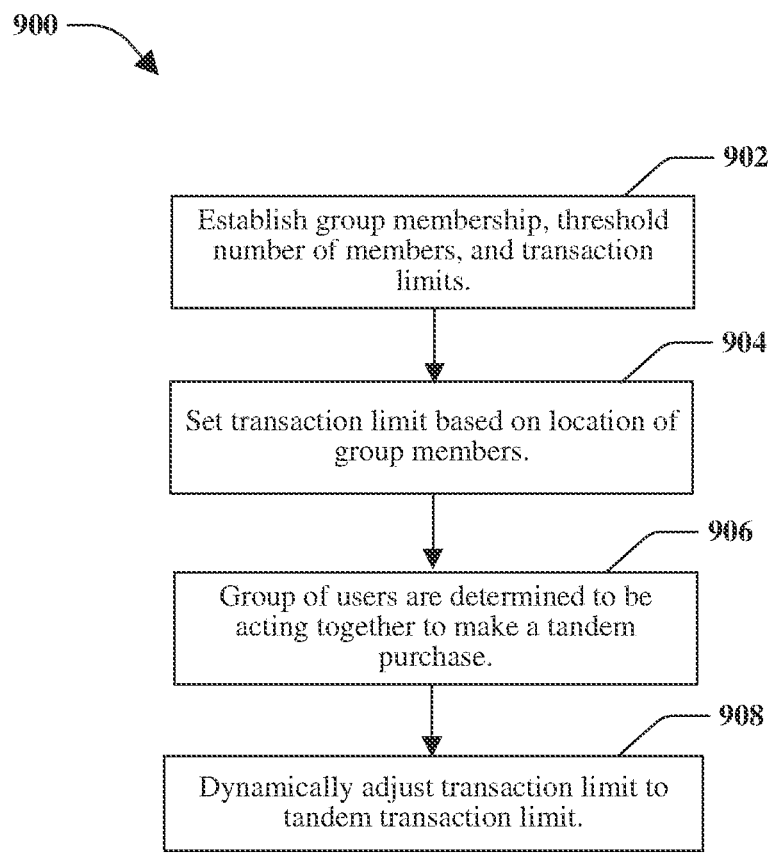
FIG. 9 illustrates an example, non-limiting method for performing tandem purchases, according to an aspect.

FIG. 9 illustrates an example, non-limiting method 900 for performing tandem purchases, according to an aspect. The method 900 in FIG. 9 may be implemented using, for example, any of the systems, such as the system 400 (of FIG. 4), described herein.

Method 900 starts, at 902 when a group of users are identified and associated as a tandem purchasing group. The group of users may include two or more users. For a group that includes three or more users, a tandem purchasing group may include all group members or less than all group members. For example, the tandem purchasing group may include any two members of a group of three users. In some implementations, a key member may need to be included as a member of the subgroup of users. For example, for a business, a purchasing manager may be a key member. In another example, for a family, at least one parent (or other trusted adult) may be a key member. If the key member is not present, and all the other members are present, the transaction is not allowed to proceed due to the lack of the key member.

At about the same time as the group membership is established, at 904, transactions limits may be established for each member individually or collectively. For example, each member may be given an individual transaction limit of $500 (or some members may have different transaction limits). Further, when the pre-identified members are acting together as a group, a joint transaction limit is established while the members are together and before expiration of a time limit. In some cases, the joint transaction limit is more than an aggregate of the individual transaction limits; in other cases the joint transaction limit is less than the aggregate of the individual transaction limits. In one specific example, a family may include parents and two children (one is 10 years old and the other is 8 years old). The parents may establish spending limits of $25.00 for each child. However, when those children are together they may only spend $40.00 together. This may be because the children have already demonstrated to their parents that when together these children act foolishly and, maybe, the older child has a negative influence on the younger child.

At 906, a determination is made whether a threshold number of users are present, or acting together for a tandem purchase. The group of users may be physically located at a same location (e.g., both checked-in at a brick and mortar store), or at a similar location (e.g., both checked-in at the same chain store, but at different location). According to some implementations, at least one of the users in the group of users may be connected to other users in the group over a wireless communications channel. For example, a first user may be at a brick-and-mortar store and the other user may be browsing a website associated with that brick-and-mortar store. In another example, the group of users may be electronically performing the tandem purchase.

Based on the determination that the threshold number of users in the group of users are acting together, at 908, the individual transaction limit of those users are dynamically changed to a tandem transaction limit. Thus, the payment vehicle of those users is automatically updated to reflect the tandem transaction limit.

If any of the group members make a transaction, the amount of the transaction is deducted from the total amount of the tandem transaction limit (e.g., remaining limit amount). Further purchases may be made, provided the time frame has not expired and/or a user has not left the area. Based on the time expiring and/or a user leaving the area, the transaction limits are dynamically changed from the tandem transaction limit to the individual transaction limits.

Figure 10:
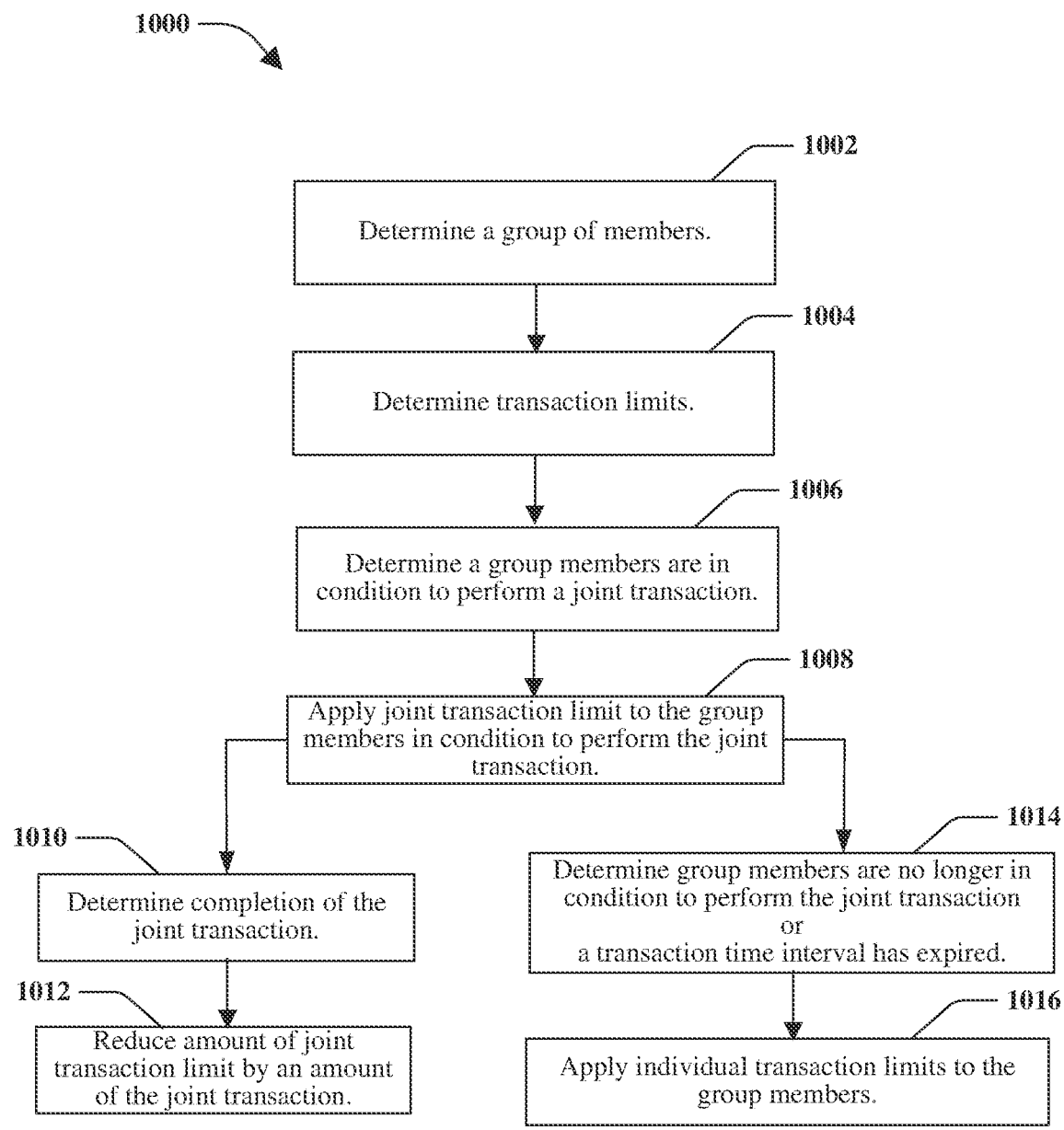
FIG. 10 illustrates an example, non-limiting method for performing tandem purchases, according to an aspect.

FIG. 10 illustrates an example, non-limiting method 1000 for performing tandem purchases, according to an aspect. The method 1000 in FIG. 10 may be implemented using, for example, any of the systems, such as the system 500 (of FIG. 5), described herein.

The method 1000 starts at 1002 when a group comprising a first set of data indicative of a first user and a second set of data indicative of a second user is determined. The group (or a subset of the group members) may be authorized to conduct joint transactions with at least one entity (e.g., a retail store, a web-based store, or other entity that performs financial transactions).

At 1004, a first individual transaction limit for the first user, a second individual transaction limit for the second user, and a subsequent individual transaction limit for a subsequent user are determined. Further, a joint transaction limit for the joint transactions are also determined. The first individual transaction limit and the second individual transaction limit are default transaction limits for the first user and the second user. Thus, if a joint transaction is not being performed, individual transactions performed by the group members are controlled by the individual transaction limits.

A determination is made at 1006 that the first user and the second user (or additional users based on a threshold number of users) are in a condition to perform a joint transaction. According to an implementation, the determination may be made based on receiving a first indication that the first user is at a first location and a second indication that the second user is at a second location. The first location and the second location represent a location common to both the first user and the second user. The first user and the second user may be physically located at the location common to both the first user and the second user.

According to some implementations, the determination at 1006 may include receiving a first indication that the first user is physically at a first location and receiving a second indication that the second user is browsing a website associated with the first location. In some implementations, the determination at 1006 may include receiving a first indication that the first user is browsing a website on a first device and receiving a second indication that the second user is browsing the website on a second device. Further to this implementation, the method may include receiving an authorization from the first user and another authorization from the second user during a threshold time period. Based on the determination, at 1008, the joint transaction limit is applied to an account associated with the first user and the second user.

According to an implementation, at 1010, completion of the joint transaction is determined. Further to this implementation, the amount of the joint transaction limit is reduced by an amount of the joint transaction, at 1012. For example, if the joint transaction limit is $1000 and the joint purchase is $750, the joint transaction limit may be reduced to $250 remaining balance.

Additionally or alternatively, at 1014, a determination is made that the first user and the second user are no longer in the condition to perform the joint transaction or a determination is made that a transaction time interval has expired. Based on this determination, at 1016, the first individual transaction limit is applied to transactions of the first user and the second individual transaction limit is applied to transactions of the second user (e.g., the joint transaction limit is revoked).

Figure 11:
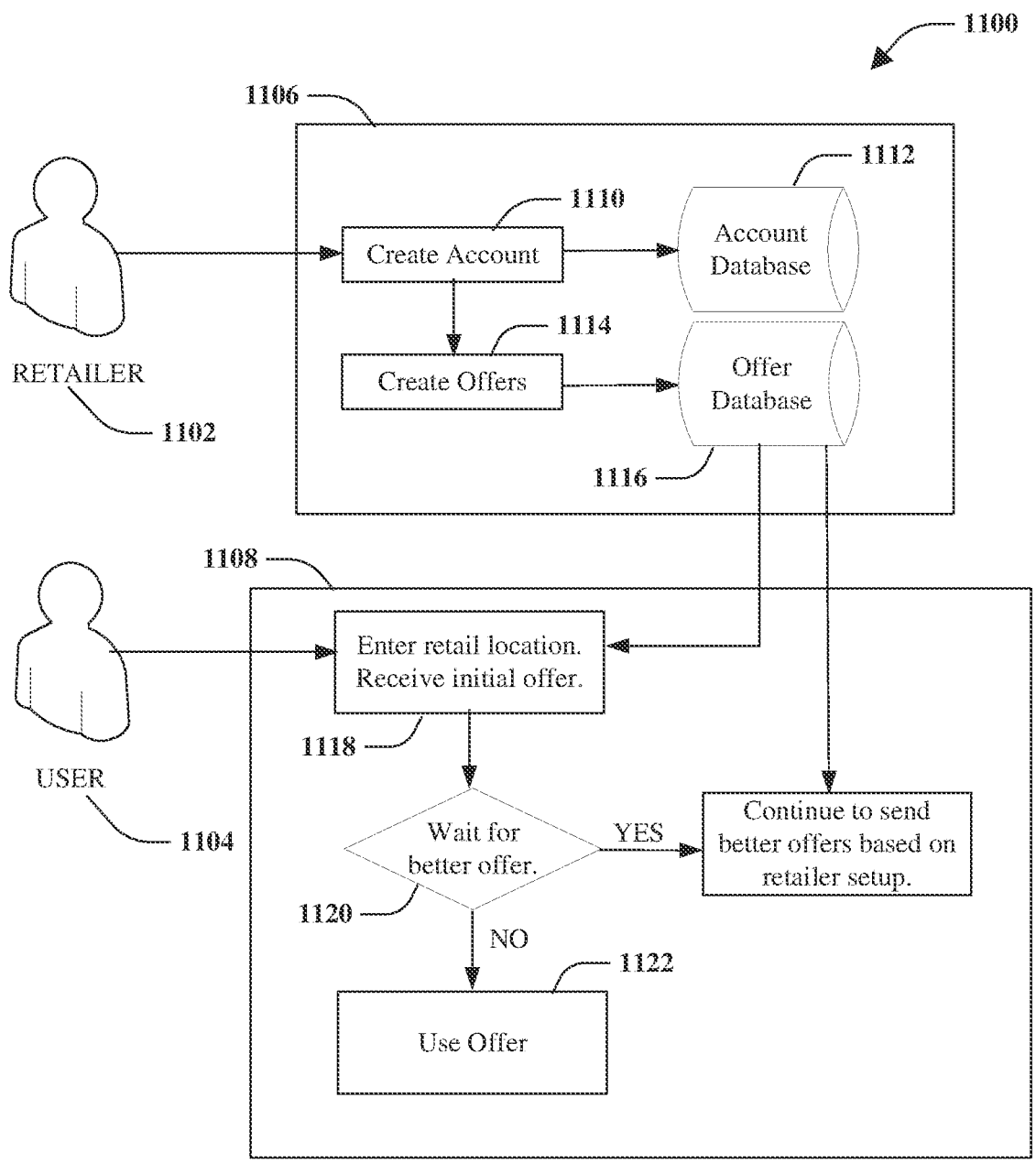
FIG. 11 illustrates an example, non-limiting method for a duration offer, according to an aspect.

FIG. 11 illustrates an example, non-limiting method 1100 for a duration offer, according to an aspect. According to various aspects, monetary compensation (or another form of reward or incentive), such as through direct payment or through increasing discounts may be provided, the longer a customer stays within a specific location, or by gathering more of their social network at the same location. Keyed by the location of their smartphone or other device, this gives the customer increasing compensation the longer they stay at a location, or the more of their social network they may bring to a location. The customer is given the choice of improving their compensation either by staying in the location longer, or bringing more of their friends to a location, based on their device's location or check-ins. In so doing, the retailer may incentivize the customer to shop. The method 1100 operates under the assumption that the customer has downloaded and installed a mobile application on their device. Further, the method 1100 may leverage the customer's pre-existing social network application.

Illustrated are a retailer 1102 and a customer 1104. The retailer 1102 is represented by one or more people acting on behalf of the retailer. Although the retailer 1102 and the customer 1104 are illustrated as people, it should be understood that the respective devices of the retailer 1102 and the customer 1104 are interacting with the systems, methods, and other embodiments as discussed herein. Further, the offer setup is illustrated in box 1106 and the duration offer is illustrated in box 1108.

The retailer 1102 creates an account, at 1110, on the system (e.g., the system 500 of FIG. 5). The account may be created on a device associated with the retailer, according to an aspect. The retailer 1102 may indicate the geographic location of a mall or a store. The application may allow for the entry of an address (e.g., a street address with city and city), geographic coordinates, and so on. According to some implementations, the application may use a mapping service to display a map of that location. Further to this implementation, the retailer (e.g., a person acting on behalf of the entity) may use a drawing tool to sketch out a perimeter of the location of the store or mall. The account details are saved to an account database, at 1112.

The application then asks the retailer 1102 to enter some offers (e.g. incentives), at 1114. An indication may be provided for the retailer 1102 to name the offer (e.g., provide a name that is descriptive). The retailer 1102 may also input or establish criteria for the offer. The offers are saved to an offer database, at 1116.

To be effective, the offers should be set up in a ladder, with the lowest offer being provided upon arriving at the location. The offers may then increase in value for the customer being at the location for a longer period and/or for the customer bringing more of their friends to the location, or both.

For example, the retailer may wish to extend a 5% discount to the customer upon arrival. After being at the location for an hour, the discount may increase to a 10% discount. After two hours, the discount may increase to a 20% discount. With each notification, a bigger discount may be offered to the customer to entice them if they stay that much longer.

The customer 1104 logs into the system (e.g., the system 500 of FIG. 5) using, for example, their social network credentials. In some aspects, the customer may already be logged into the application prior to entering the geographic area. The application, in the background processes of the device, may log the customer's current location to the backend database (e.g., the system 500 of FIG. 5). The backend system may check to determine if the customer has entered a location with offers. If it is determined that the customer has entered the location, the offer is generated and sent to the customer, at 1118.

The first message that the customer receives, is an initial offer. The offer may include an attached bar code/QR code for the retailer to use as a coupon. The initial offer may provide a minor discount and tease the customer with a bigger discount, provided the user stays in the location for a specific amount of time.

The user makes a determination, at 1120, whether to wait for another offer. If the user decides not to wait for another offer ("NO"), the user has accepted the offer, at 1122. If the user decides to wait for another offer ("YES"), when a threshold amount of time is reached, a better offer is sent. The better offer may include another bar/QR code that may be used for redemption of the incentive. This offer may tease another offer if the customer stays in that location even longer. This may continue over time and is controlled by the retailer in an administrative interface of the mobile application. If the shopper leaves the area, the offer becomes void.

Figure 12:
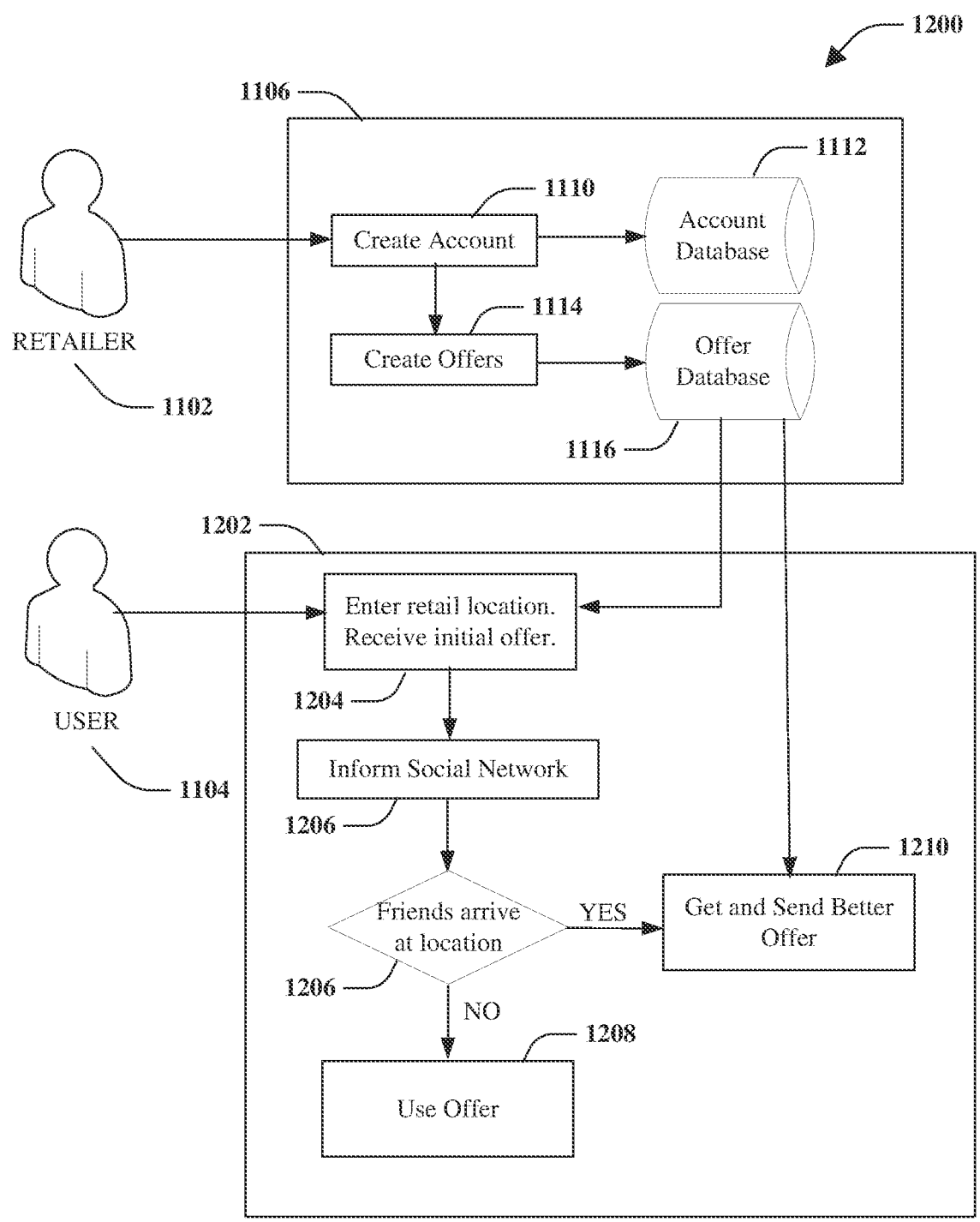
FIG. 12 illustrates an example, non-limiting method for a social aspect offer, according to an aspect.

FIG. 12 illustrates an example, non-limiting method 1200 for a social aspect offer, according to an aspect. The offer setup is illustrated in box 1106 is similar to the setup of FIG. 11 and will not be discussed again. The social offer setup is illustrated in box 1202.

A determination is made at 1204 that the customer has entered the retail location. The customer logs into their social network, at 1206, (or is already logged into the social network prior to entering the geographic location). The first message the customer receives may be an initial minor offer. For example, the retailer may extend a 5% discount upon arrival, a 10% discount if a person that is one of the customers social network also arrives, and a 15% discount on two people arriving, and so on. The retailer may increase the discounts along one of both of these axes. Thus, the customer is teased into improving the offer if the customer brings some (or more) of their friends to that location. For example, the offer may be "5% now, but if a friend joins you, you get 10%."

The user's social network may be captured and that network may be polled to determine, at 1206, if any of the people in the user's network are within the geo-location of the user. If there are no other people in the network at the location (and they do not join in a predetermined amount of time), the current offer may be used, at 1208.

However, if there are people in the user's network at the location (or arrive within a set amount of time), the determination is that friends arrive at the location ("YES"). In this case, an even better offer may be transmitted to the user, at 1210. For example, the offer may be "Get another friend to join you and get 20% off." This operates as an incentive to bring the shopper's friends to that location. The offer ladder may be increased as more friends join. This offer may remain with the original shopper, and/or may be extended to the friends that have joined at the location. Further, one or more friends may be provided a similar offer (e.g., bring more friends).

This offer may also be a combination of duration and social. For example, the shopper may be given the option of staying at the mall for another hour, or inviting two friends to join. If the shopper accomplishes at least one, the shopper receives a 20% discount. If the shopper achieves both, the shopper receives a 40% discount. If the shopper leaves the area, the offer becomes void.

Figure 13:
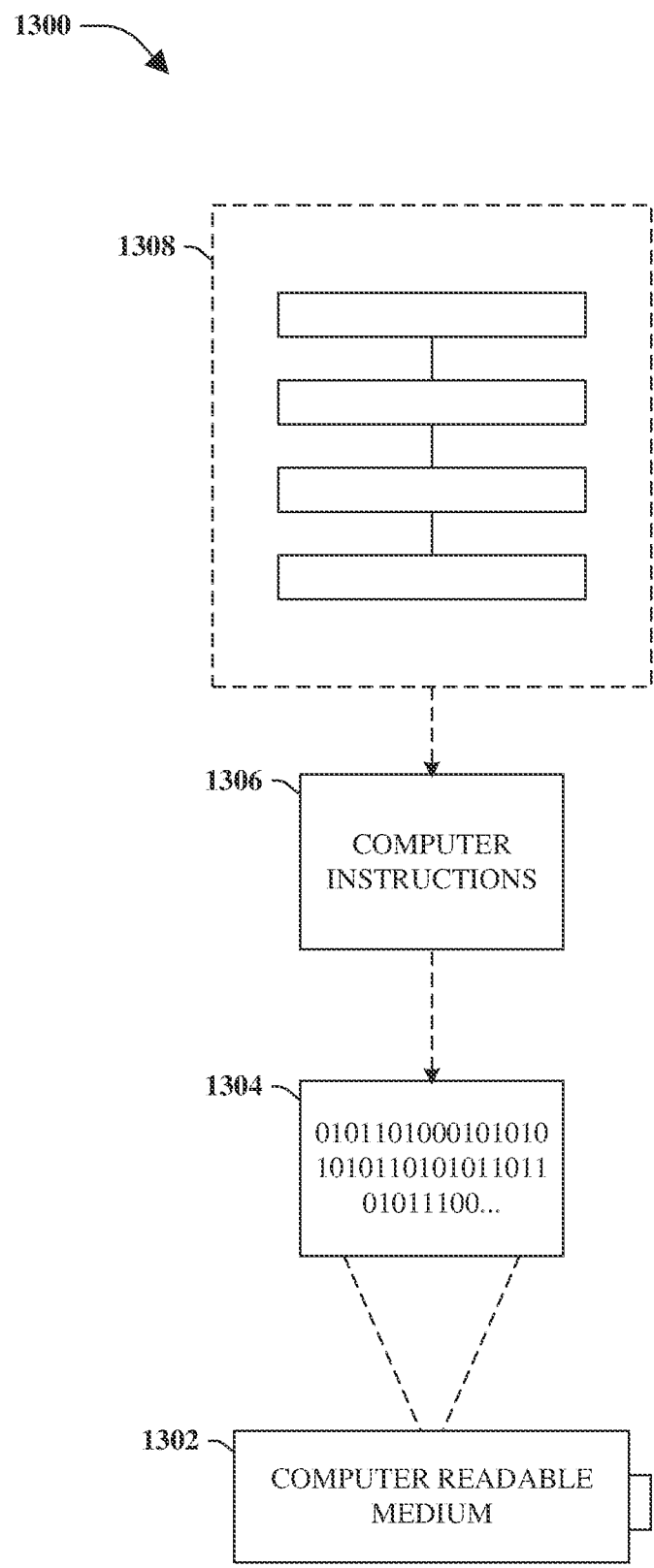
FIG. 13 illustrates an example, non-limiting computer-readable medium or computer-readable device including processor-executable instructions configured to embody one or more of the aspects set forth herein.

One or more implementations include a computer-readable medium including microprocessor or processor-executable instructions configured to implement one or more embodiments presented herein. As discussed herein the various aspects enable identification of anomalous transaction attributes in real-time with adaptive threshold tuning. An embodiment of a computer-readable medium or a computer-readable device devised in these ways is illustrated in FIG. 13, wherein an implementation 1300 includes a computer-readable medium 1302, such as a CD-R, DVD-R, flash drive, a platter of a hard disk drive, and so forth, on which is encoded computer-readable data 1304. The computer-readable data 1304, such as binary data including a plurality of zero's and one's as illustrated, in turn includes a set of computer instructions 1306 configured to operate according to one or more of the principles set forth herein.

In the illustrated embodiment 1300, the set of computer instructions 1306 (e.g., processor-executable computer instructions) may be configured to perform a method 1308, such as the method 1000 of FIG. 10 and/or the method 1200 of FIG. 12, for example. In another embodiment, the set of computer instructions 1306 may be configured to implement a system, such as the system 400 of FIG. 4 and/or the system 500 of FIG. 5, for example. Many such computer-readable media may be devised by those of ordinary skill in the art that are configured to operate in accordance with the techniques presented herein.

As used in this application, the terms "component", "module," "system", "interface," "manager," and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter may be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

FIG. 13 and the following discussion provide a description of a suitable computing environment to implement embodiments of one or more of the aspects set forth herein. The operating environment of FIG. 13 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

Figure 14:
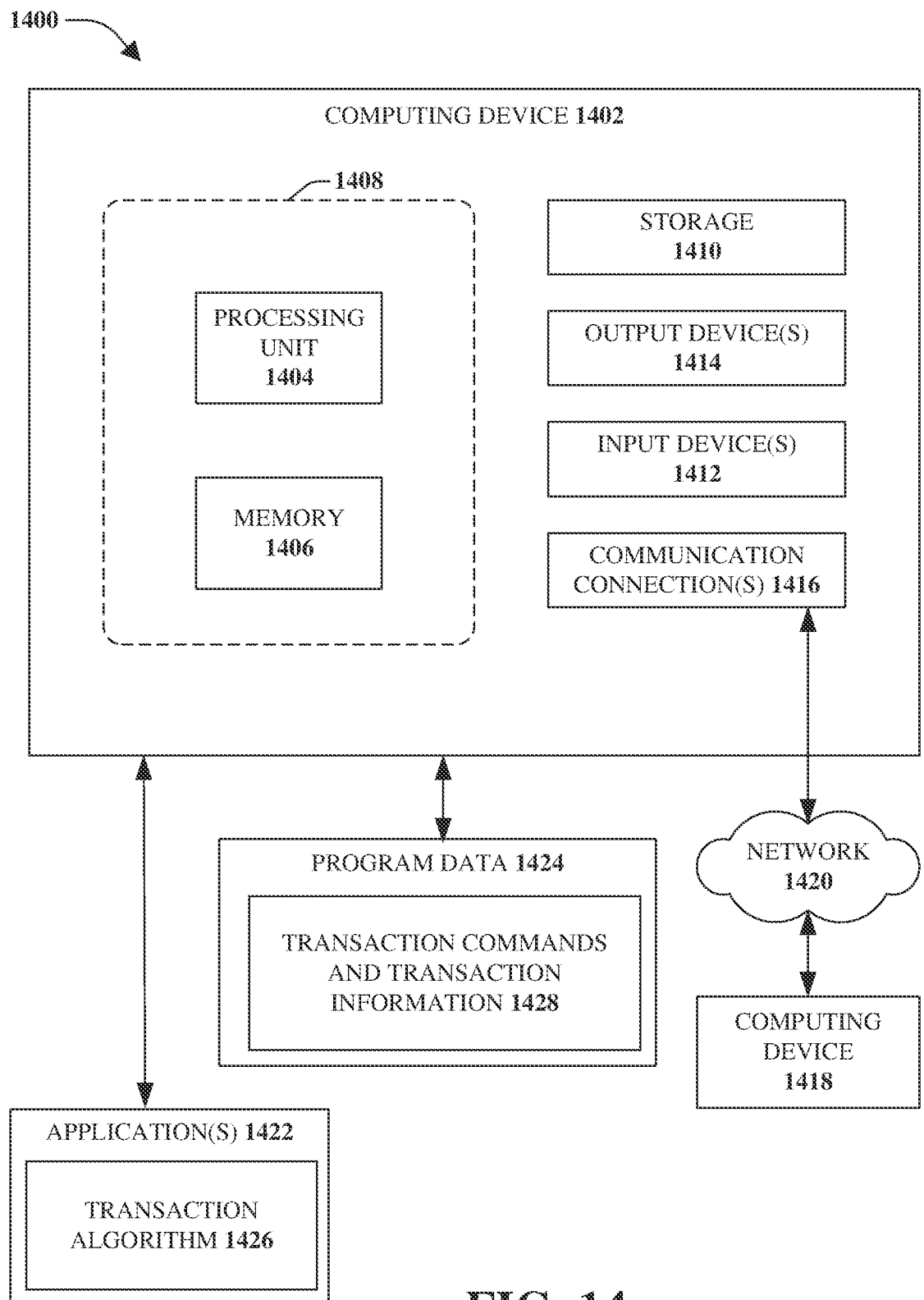
FIG. 14 illustrates an example, non-limiting computing environment where one or more of the aspects set forth herein are implemented, according to one or more aspects.

FIG. 14 illustrates a system 1400 that may include a computing device 1402 configured to implement one or more embodiments provided herein. In one configuration, the computing device 1402 may include at least one processing unit 1404 and at least one memory 1406. Depending on the exact configuration and type of computing device, the at least one memory 1406 may be volatile, such as RAM, non-volatile, such as ROM, flash memory, etc., or a combination thereof. This configuration is illustrated in FIG. 14 by dashed line 1408.

In other embodiments, the computing device 1402 may include additional features or functionality. For example, the computing device 1402 may include additional storage such as removable storage or non-removable storage, including, but not limited to, magnetic storage, optical storage, etc. Such additional storage is illustrated in FIG. 14 by storage 1410. In one or more embodiments, computer readable instructions to implement one or more embodiments provided herein are in the storage 1410. The storage 1410 may store other computer readable instructions to implement an operating system, an application program, etc. Computer readable instructions may be loaded in the at least one memory 1406 for execution by the at least one processing unit 1404, for example.

Computing devices may include a variety of media, which may include computer-readable storage media or communications media, which two terms are used herein differently from one another as indicated below.

Computer-readable storage media may be any available storage media, which may be accessed by the computer and includes both volatile and nonvolatile media, removable and non-removable media. By way of example, and not limitation, computer-readable storage media may be implemented in connection with any method or technology for storage of information such as computer-readable instructions, program modules, structured data, or unstructured data. Computer-readable storage media may include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which may be used to store desired information. Computer-readable storage media may be accessed by one or more local or remote computing devices (e.g., via access requests, queries or other data retrieval protocols) for a variety of operations with respect to the information stored by the medium.

Communications media typically embody computer-readable instructions, data structures, program modules, or other structured or unstructured data in a data signal such as a modulated data signal (e.g., a carrier wave or other transport mechanism) and includes any information delivery or transport media. The term "modulated data signal" (or signals) refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The computing device 1402 may include input device(s) 1412 such as keyboard, mouse, pen, voice input device, touch input device, infrared cameras, video input devices, or any other input device. Output device(s) 1414 such as one or more displays, speakers, printers, or any other output device may be included with the computing device 1402. The input device(s) 1412 and the output device(s) 1414 may be connected to the computing device 1402 via a wired connection, wireless connection, or any combination thereof. In one or more embodiments, an input device or an output device from another computing device may be used as the input device(s) 1412 and/or the output device(s) 1414 for the computing device 1402. Further, the computing device 1402 may include communication connection(s) 1416 to facilitate communications with one or more other devices, illustrated as a computing device 1418 coupled over a network 1420.

One or more applications 1422 and/or program data 1424 may be accessible by the computing device 1402. According to some implementations, the application(s) 1422 and/or program data 1424 are included, at least in part, in the computing device 1402. The application(s) 1422 may include a transaction algorithm 1426 that is arranged to perform the functions as described herein including those described with respect to the system 300 of FIG. 3. The program data 1424 may include transaction commands and transaction information 1428 that may be useful for operation with the various aspects as described herein.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or." Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first," "second," or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising," "comprises," "including," "includes," or the like generally means comprising or including.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A method, comprising:
   receiving, by a system comprising a processor, an indication that a device associated with a first user has entered a defined geographic area;
   outputting, by the system, a first incentive to the first user through the device, wherein the first incentive includes details related to a first action that results in a second incentive;
   providing, by the system, the second incentive to the first user based on a determination that the first action has been satisfied;
   determining, by the system and based on a current location of the first user, a second user identified as being related to the first user;
   receiving, by the system, a second indication that another device associated with a second user has entered the defined geographic area within a predetermined amount of time; and
   in response to receiving the second indication, providing, by the system, a third incentive to the first user.

2. The method of claim 1, wherein the current location of the first user is determined based in part on data received from a social network application.

3. The method of claim 1, further comprising determining a location of the second user based in part on data received from a social network application.

4. The method of claim 1, wherein the first action relates to one of a temporal aspect or a social aspect.

5. The method of claim 4, wherein the temporal aspect is the first user passing a temporal threshold while within the defined geographic area.

6. The method of claim 1, wherein the first incentive is a monetary reward associated with the defined geographic area.

7. The method of claim 6, wherein the second incentive is a monetary reward associated with the defined geographic area.

8. The method of claim 7, wherein the second incentive is greater than the first incentive.

9. The method of claim 8, wherein the third incentive is greater than both the first incentive and the second incentive.

10. A system, comprising:
    a processor configured to:

receive an indication that a device associated with a first user has entered a defined geographic area;

output a first incentive to the first user through the device, wherein the first incentive includes details related to a first action that results in a second incentive;

provide the second incentive to the first user based on a determination that the first action has been satisfied;

determine, based in part on a current location of the first user, a second user identified as being related to the first user;

receive a second indication that another device associated with a second user has entered the defined geographic area within a predetermined amount of time; and in response to receiving the second indication, provide a third incentive to the first user.

11. The system of claim 10, wherein the current location of the first user is determined based in part on data received from a social network application.

12. The system of claim 10, further comprising determining a location of the second user based in part on data received from a social network application.

13. The system of claim 10, wherein the first action relates to one of a temporal aspect or a social aspect.

14. The system of claim 13, wherein the temporal aspect is the first user passing a temporal threshold while within the defined geographic area.

15. The system of claim 10, wherein the first incentive is a monetary reward associated with the defined geographic area.

16. The system of claim 15, wherein the second incentive is a monetary reward associated with the defined geographic area.

17. The system of claim 16, wherein the second incentive is greater than the first incentive.

18. The system of claim 17, wherein the third incentive is greater than both the first incentive and the second incentive.

19. A non-transitory computer readable medium comprising program code that when executed by one or more processors is configured to cause the one or more processors to:

receive an indication that a device associated with a first user has entered a defined geographic area;

output a first incentive to the first user through the device, wherein the first incentive includes details related to a first action that results in a second incentive;

provide the second incentive to the first user based on a determination that the first action has been satisfied;

determine, based in part on a current location of the first user, a second user identified as being related to the first user;

receive a second indication that another device associated with a second user has entered the defined geographic area within a predetermined amount of time; and in response to receiving the second indication, provide a third incentive to the first user.

20. The non-transitory computer readable medium of claim 19, wherein the current location of the first user is determined based in part on data received from a social network application.

* * * * *